United States Patent
Jakuszeski et al.

(10) Patent No.: US 7,438,512 B2
(45) Date of Patent: *Oct. 21, 2008

(54) U-BOLT ASSEMBLY

(75) Inventors: Gerard S. Jakuszeski, Oxford, MI (US); Larry J. Wilson, Commerce Township, MI (US); David A. Harris, Fulton, IL (US); John V. Crowe, Lake Bluff, IL (US)

(73) Assignee: MacLean-Fogg Company, Mundelein, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/718,914

(22) Filed: Nov. 21, 2003

(65) Prior Publication Data
US 2004/0213646 A1    Oct. 28, 2004

Related U.S. Application Data

(63) Continuation-in-part of application No. 10/430,794, filed on May 5, 2003, now Pat. No. 7,334,975, which is a continuation-in-part of application No. 09/933,312, filed on Aug. 20, 2001, now Pat. No. 6,749,386, application No. 10/718,914, which is a continuation-in-part of application No. 09/933,312.

(51) Int. Cl.
*F16B 35/00* (2006.01)
*F16B 39/30* (2006.01)

(52) U.S. Cl. .................. 411/389; 411/386; 411/311

(58) Field of Classification Search ............ 411/388, 411/389, 400, 401, 411, 412, 308–311, 386
See application file for complete search history.

(56) References Cited

U.S. PATENT DOCUMENTS

| | | | |
|---|---|---|---|
| 292,063 A | 1/1884 | Shailer | |
| 367,196 A | 7/1887 | Deblieux | |
| 369,392 A | * 9/1887 | Bungarz | 411/389 |
| 738,217 A | 9/1903 | Love | |
| 752,628 A | 2/1904 | Miner | |
| 827,562 A | 7/1906 | Pollock et al. | |
| 889,593 A | 6/1908 | Fleischmann | |
| 948,326 A | 2/1910 | Hesse | |
| 1,015,059 A | 1/1912 | Morgan | |
| 1,040,215 A | 10/1912 | Kriner | |
| 1,088,892 A | 3/1914 | Foreman | |
| 1,140,974 A | 5/1915 | Formby | |
| 1,250,748 A | 12/1917 | Woodward | |
| 1,297,845 A | 3/1919 | Hawrylasz | |
| 1,300,801 A | 4/1919 | Woodward | |

(Continued)

FOREIGN PATENT DOCUMENTS

DE    298 15 492 U1    10/1998

(Continued)

*Primary Examiner*—Flemming Saether
(74) *Attorney, Agent, or Firm*—Dana Andrew Alden

(57) ABSTRACT

The present invention relates to a u-bolt comprising, a shaft having a curved portion and two ends, the ends each have a threaded surface, the curved portion is located between the ends, at least a portion of the end has a trilobular shape, and the curved portion is shaped so that a distance between the ends is shorter than the length of the end.

24 Claims, 36 Drawing Sheets

U.S. PATENT DOCUMENTS

| | | | |
|---|---|---|---|
| 1,451,484 A | 4/1923 | Woodward | |
| 1,622,581 A | 3/1927 | Gunkel | |
| 1,697,118 A | 1/1929 | Hoke | |
| 1,798,604 A | 3/1931 | Hoke | |
| 1,807,494 A | 5/1931 | Proctor | |
| 1,828,856 A | 10/1931 | Bridges | |
| 1,862,486 A | 6/1932 | Trotter | |
| 1,952,305 A | 3/1934 | Beck | |
| 2,109,778 A | 3/1938 | Meersteiner | |
| 2,177,003 A | 10/1939 | Purtell | |
| 2,177,004 A | 10/1939 | Purtell | |
| 2,177,005 A | 10/1939 | Purtell | |
| 2,210,455 A | 8/1940 | Hosking | |
| 2,253,241 A | 8/1941 | MacDonald | |
| 2,266,758 A | 12/1941 | Holtz | |
| 2,269,476 A | 1/1942 | Poupitch | |
| 2,301,181 A | 11/1942 | Lisemann | |
| 2,367,213 A | 1/1945 | Harding | |
| 2,371,365 A | 3/1945 | Tomalis | |
| 2,377,405 A | 6/1945 | Davies | |
| 2,382,019 A | 8/1945 | Miller | |
| 2,407,160 A | 9/1946 | Kohn | |
| 2,437,638 A | 3/1948 | Evans | |
| 2,562,032 A | 7/1951 | Gutensohn | |
| 2,637,361 A | 5/1953 | Nagel | |
| 2,679,774 A | 6/1954 | MacDonald | |
| 2,735,470 A | 2/1956 | Poupitch | |
| 2,783,810 A | 3/1957 | Wrigley | |
| 2,788,046 A | 4/1957 | Rosan | |
| 2,856,617 A | 10/1958 | Widmann | |
| 2,873,641 A | 2/1959 | Evans | |
| 2,901,019 A | 8/1959 | Schweppe | |
| 3,076,208 A | 2/1963 | Moore | |
| 3,078,899 A | 2/1963 | MacLean, III et al. | |
| 3,124,188 A | 3/1964 | Muenchinger | |
| 3,182,703 A | 5/1965 | Smyth | |
| 3,196,918 A | 7/1965 | Hampton | |
| 3,213,742 A | 10/1965 | Kahn | |
| 3,247,877 A * | 4/1966 | Evans | 411/311 |
| 3,249,142 A | 5/1966 | Phipard | |
| 3,301,299 A | 1/1967 | Stanwick | |
| 3,339,389 A | 9/1967 | Moscow | |
| 3,342,234 A | 9/1967 | Evans | |
| 3,391,721 A | 7/1968 | Rosan | |
| 3,417,802 A | 12/1968 | Oldenkott | |
| 3,426,820 A | 2/1969 | Phipard | |
| 3,459,250 A | 8/1969 | Tabor | |
| 3,489,195 A | 1/1970 | Mortus | |
| 3,504,722 A | 4/1970 | Breed | |
| 3,517,717 A | 6/1970 | Orlomoski | |
| 3,530,920 A | 9/1970 | Podell | |
| 3,633,455 A | 1/1972 | Larson | |
| 3,653,241 A | 4/1972 | Orlomoski | |
| 3,693,685 A | 9/1972 | Onufer | |
| 3,721,283 A | 3/1973 | Evans | |
| 3,794,092 A | 2/1974 | Carlson | |
| 3,850,215 A | 11/1974 | Orlomoski | |
| 3,851,690 A | 12/1974 | Wing et al. | |
| 3,856,065 A | 12/1974 | Gehring | |
| 3,875,780 A | 4/1975 | Cochrum | |
| 3,877,339 A | 4/1975 | Muenchinger | |
| 3,877,502 A * | 4/1975 | Hunckler | 411/274 |
| 3,878,759 A | 4/1975 | Carlson | |
| 3,901,066 A | 8/1975 | Orlomoski | |
| 3,907,017 A | 9/1975 | Stanwick | |
| 3,935,785 A | 2/1976 | Lathom | |
| 3,942,406 A | 3/1976 | Egner | |
| 3,942,570 A | 3/1976 | Bochman, Jr. et al. | |
| 3,978,760 A * | 9/1976 | Muenchinger | 411/386 |
| 3,982,575 A | 9/1976 | Ollis, Jr. et al. | |
| 4,040,327 A | 8/1977 | Otaki | |
| 4,071,067 A | 1/1978 | Goldby | |
| 4,076,064 A | 2/1978 | Holmes | |
| 4,150,702 A | 4/1979 | Holmes | |
| 4,171,012 A | 10/1979 | Holmes | |
| 4,252,168 A | 2/1981 | Capuano | |
| 4,258,607 A | 3/1981 | Makwam | |
| 4,339,179 A | 7/1982 | Dany | |
| 4,341,497 A * | 7/1982 | Downey et al. | 411/311 |
| 4,377,361 A | 3/1983 | Frieberg | |
| 4,790,703 A | 12/1988 | Wing | |
| 4,810,106 A * | 3/1989 | Ohike | 384/428 |
| 4,812,095 A | 3/1989 | Piacenti et al. | |
| 4,820,098 A | 4/1989 | Taubert | |
| 4,867,625 A | 9/1989 | Dixon | |
| 4,941,787 A | 7/1990 | Shaffer | |
| 5,000,638 A * | 3/1991 | Essom et al. | 411/386 |
| 5,071,301 A | 12/1991 | Engelhardt et al. | |
| 5,141,374 A | 8/1992 | Olofsson | |
| 5,409,338 A | 4/1995 | McKinlay | |
| 5,626,449 A * | 5/1997 | McKinlay | 411/149 |
| 5,746,560 A | 5/1998 | Barth | |
| 5,984,602 A | 11/1999 | Park | |
| 5,997,231 A | 12/1999 | Goodwin | |
| 6,062,786 A * | 5/2000 | Garver et al. | 711/386 |
| 6,135,689 A | 10/2000 | Matsunami | |
| 6,155,761 A * | 12/2000 | Donovan | 411/386 |
| 6,296,432 B1 * | 10/2001 | Kato | 411/386 |
| 6,776,565 B2 | 8/2004 | Chang | |
| 6,796,761 B2 | 9/2004 | Mizuno | |
| 2002/0039522 A1 | 4/2002 | Hartman et al. | |

FOREIGN PATENT DOCUMENTS

DE 199 56 287 A1 5/2001

* cited by examiner

72

FIG. 28
FIG. 29
FIG. 30
FIG. 31
FIG. 32
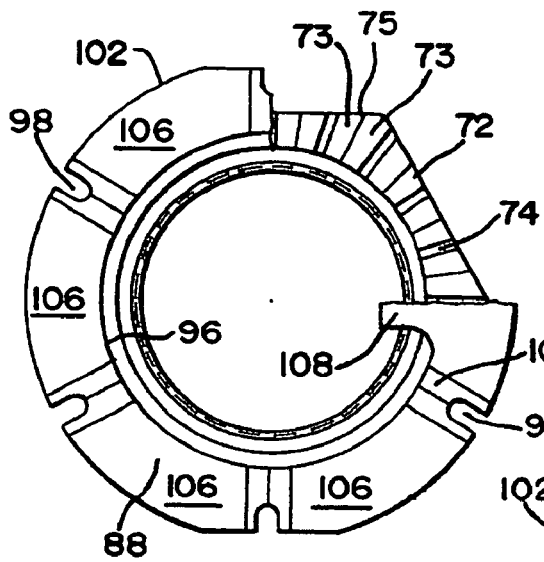
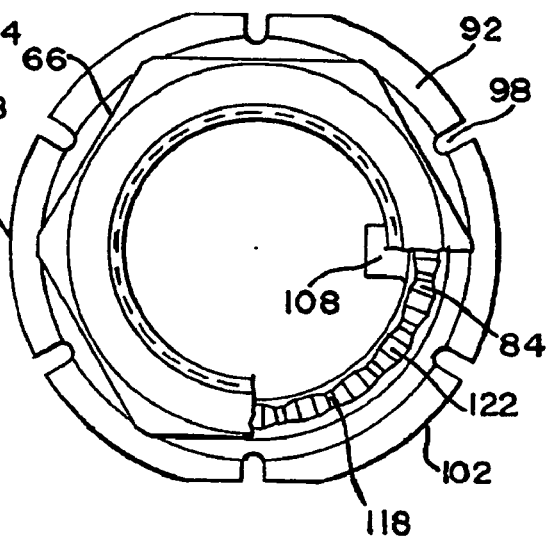
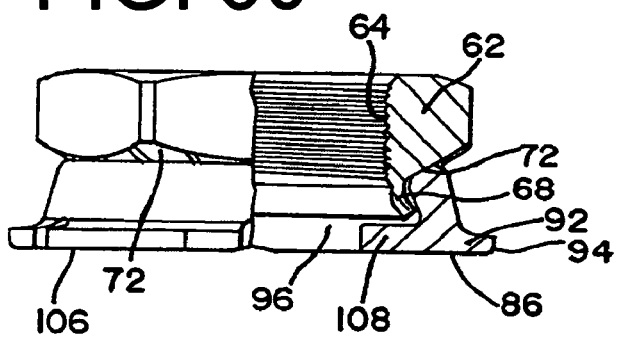
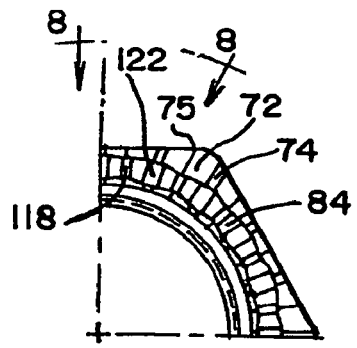
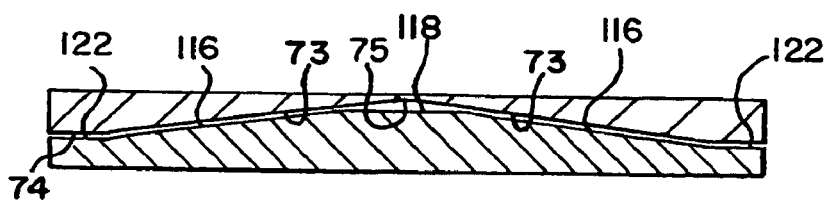

U-BOLT ASSEMBLY

This is a continuation-in-part of application Ser. No. 10/430,794, entitled Fastener Assembly, and filed on May 5, 2003, now U.S. Pat. No. 7,334,975, which is a continuation-in-part of application Ser. No. 09/933,312, filed on Aug. 20, 2001 now U.S. Pat. No. 6,749,386. Accordingly, this application is a continuation-in-part of application Ser. No. 09/933,312, filed on Aug. 20, 2001, now U.S. Pat. No. 6,749,386.

FIELD OF THE INVENTION

This invention relates to u-bolt assemblies, and particularly to u-bolt assemblies used for clamping, securing, or sealing one or more elements.

BACKGROUND OF THE INVENTION

U-bolts are used in many applications, including for clamping one or more elements, securing or supporting one or more elements, or sealing a connected region between two elements. U-bolts are typically utilized in combination with a cross member and a plurality of nuts.

In the typical application, a pair of nuts are threaded onto a pair of threaded ends provided on the u-bolt. As the nuts are threaded onto the ends, they exert a force upon the cross member in the direction of a curved portion on the u-bolt. The nuts are threaded onto the end until they reach a desired point on the end whereupon the cross member is located a desired distance from the curved portion. In such a manner, the nuts may be threaded so that the u-bolt and cross member cooperate to secure one or more elements located there between or clamp one or more elements located there between.

In certain applications, for example, in the exhaust system of a vehicle, there are several exhaust conduits, tubes, hoses or pipes of various shapes and lengths which are connected together to form a fluid path for the exhaust gas. In addition to being clamped, supported or secured, it may also be important that the connected region be provided with a substantially leak-proof and mechanically secure joint. For these applications, typically, the cross member is provided with a concave portion which opposes a corresponding concave curved portion on the u-bolt. As the cross member and u-bolt are forced towards each other through the use of a pair of nuts that are threaded on the ends of the u-bolt, the corresponding concave portions cooperate to reduce or eliminate leakage from the connected region. Sometimes it is still difficult to achieve uniformly leak-proof joints because the narrowness of such u-bolts and cross members makes it difficult to completely cover and connected region. This problem can be overcome by using one or more relatively wide shims in combination with a u-bolt and a cross member to effectively and easily seal the connected region.

Whatever the application, for most, it is often crucial that the nuts do not loosen or disengage once they are threaded onto the end whereby an element or elements are secured, clamped, or sealed. If the nuts back off the end, a safety hazard may arise because the element or elements cease to be secured, supported, clamped, or sealed. The present invention is directed to overcoming this and other disadvantages inherent in prior-art systems.

SUMMARY OF THE INVENTION

The scope of the present invention is defined solely by the appended claims, and is not affected to any degree by the statements within this summary. Briefly stated, a u-bolt comprising, a shaft having a curved portion and two ends, the ends each have a threaded surface, the curved portion is located between the ends, at least a portion of the end has a trilobular shape, and the curved portion is shaped so that a distance between the ends is shorter than the length of the end.

BRIEF DESCRIPTION OF THE DRAWINGS

FIG. 28 is a bottom plain view, partially in section, of a fastener assembly of an alternative embodiment;

FIG. 29 is a top plain view, partially in section, of a fastener assembly of an alternative embodiment;

FIG. 30 is a side elevational view, partially in section, of a nut and washer of an alternative embodiment;

FIG. 31 is a plain view of a quarter segment of overlying annular and bearing surfaces of a nut and washer, respectively, of an alternative embodiment, showing their relationship to each other circumferentially;

FIG. 32 is an enlarged sectional view of an arcuate portion (on an 180 arc in the present illustration) of the faces and faces mating in the assembly of an alternative embodiment, the view depicting curved surfaces as straight because of this;

DETAILED DESCRIPTION OF THE PRESENTLY PREFERRED EMBODIMENTS

Figure 1:
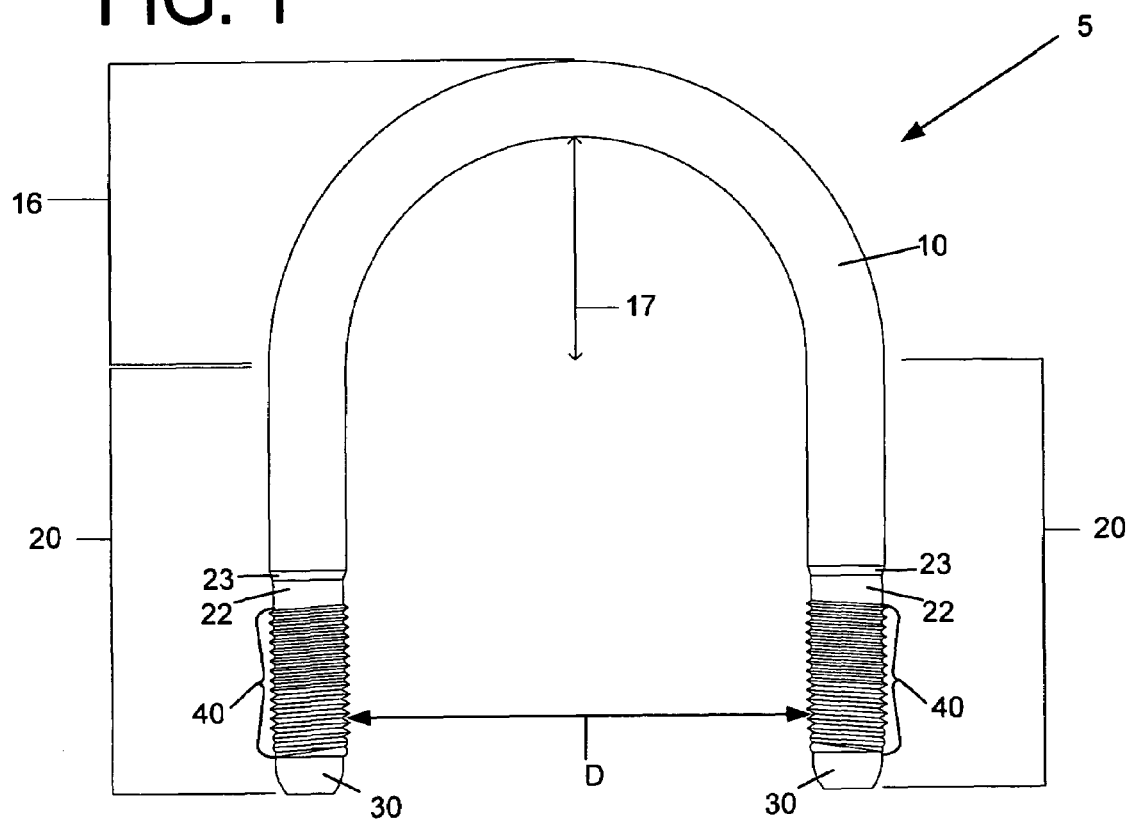
FIG. 1 depicts a side elevational view of the u-bolt of the preferred embodiment.

Turning now to the drawings, FIG. 1 shows a stud as a u-bolt 5 of a preferred embodiment of the present invention. The u-bolt 5 is composed of a metal, preferably aluminum. According to one aspect of the present invention, the metal is copper. According to another aspect of the present invention, the metal is iron.

In one aspect of the present invention, the metal is an alloy. According to another aspect of the present invention, the metal includes ferrous and non-ferrous materials. According to another aspect of the present invention, the metal is a steel. By way of example and not limitation, the steel is a stainless steel, such as A286. In one embodiment of the present invention the steel is a low carbon steel, such as 1010. In another embodiment of the present invention, the steel is a medium carbon steel, such as 1038, 1541, 4037, 8640, or 8650. In yet another embodiment of the present invention, the steel is a high carbon steel.

Those with skill in the art will also appreciate that the metal is a super alloy. According to one aspect of the present invention, the super alloy is bronze; according to another aspect of the present invention, the super alloy is a high nickel material. According to yet another aspect of the present invention, the u-bolt 5 is composed of martensitic material, such as 410 or 416. According to still another aspect of the present invention, the u-bolt 5 is composed of austenitic material, such as 302HQ, 304, or 305. According to another aspect of the present invention, the metal is a ferritic material.

FIG. 1 depicts the u-bolt 5 of the presently preferred embodiment of the present invention. As shown therein, the u-bolt 5 includes a shaft 10 that is provided with a curved portion 16 and two ends 20. The curved portion 16 of the preferred embodiment is a round bend. As shown in FIG. 1, the curved portion 16 of the preferred embodiment is provided with a radius 17.

Figure 2:
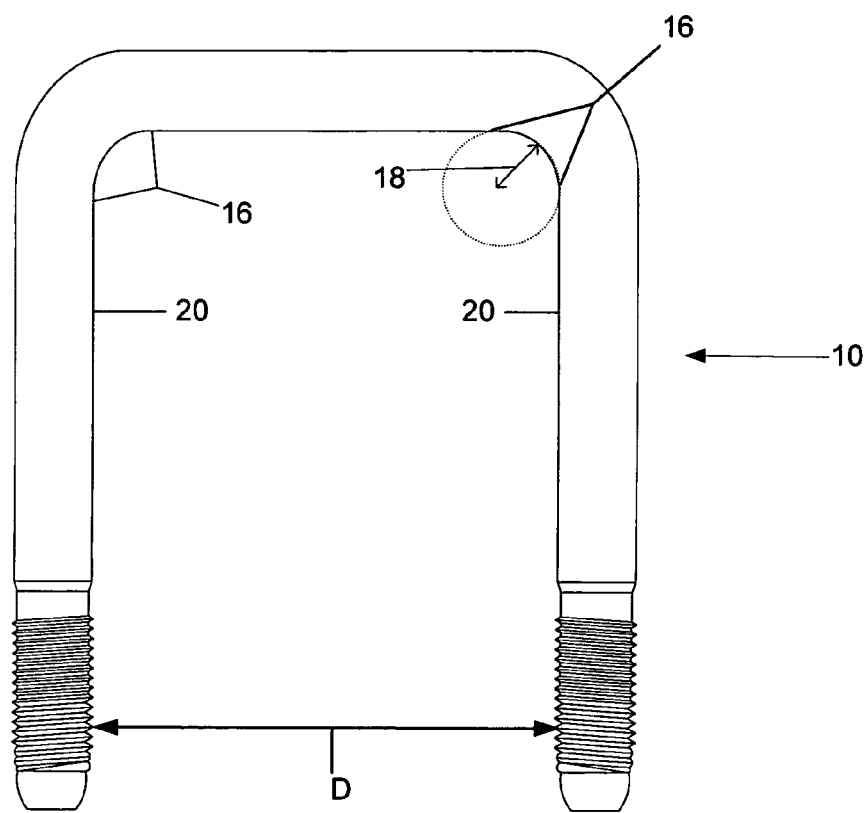
FIG. 2 depicts a side elevational view of the u-bolt of an alternative embodiment.

As shown in FIG. 2, in an alternative embodiment the shaft 10 is provided with a curved portion 16 that is a square bend. The curved portion 16 of this embodiment is provided with radiuses 18.

Figure 3:
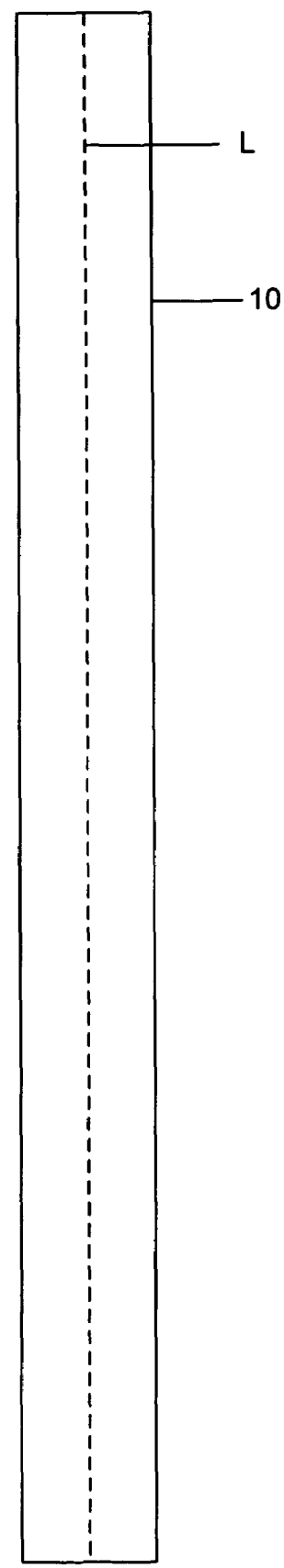
FIG. 3 depicts a side elevational view of the shaft depicting the length of the shaft.

As shown in FIGS. 1 and 2, the curved portion 16 is located between the pair of ends 20. Also shown therein, the curved portion is shaped so that there is a distance D between the ends 20. The distance D is related to a length L of the shaft 10, which is shown in FIG. 3. The curved portion 16 is shaped so that the distance D between the ends 20 is shorter than the length of the shaft 10.

At least one of the ends 20 is provided with a contoured outer surface. Preferably both ends 20 are provided with a contoured outer surface. In the preferred embodiment, ends 20 are each provided with an identically contoured outer surface.

FIG. 1 depicts an end 20 of the preferred embodiment of the present invention composed of a plurality of outer surfaces. As illustrated in FIG. 1, the end 20 provides a suitable location for at least one of a plurality of outer surfaces. A lower cylindrical end element 22 of the preferred embodiment includes a plurality of threads 40. Located adjacent to the threads 40 is an unthreaded surface 30.

The outer surfaces of the present invention perform a plurality of functions. In the preferred embodiment, the surface composed of a plurality of threads 40 functions to couple the u-bolt 5 to another structure. This function is accomplished through the interaction of the plurality of threads 40 and the cooperating threads of a nut body 62.

The end 20 is composed of at least one of a plurality of end elements. According to one aspect of the present invention, the end element is cylindrical in shape. According to another aspect of the present invention, the end element is conical in shape. According to yet another aspect of the present invention, the end element is solid.

FIG. 1 depicts the preferred embodiment of the present invention composed of a plurality of end elements. The end 20 includes an upper cylindrical end element 21, a lower cylindrical end element 22, and a conical end element 23. In the preferred embodiment, the upper cylindrical end element 21 is joined to the lower cylindrical end element 22 via the conical end element 23.

The u-bolt 5 of the present invention is provided with a plurality of outer surfaces. According to one aspect of the present invention, the outer surface is an unthreaded surface 30. According to another aspect of the present invention, the outer surface is a threaded surface 40.

Figure 4:
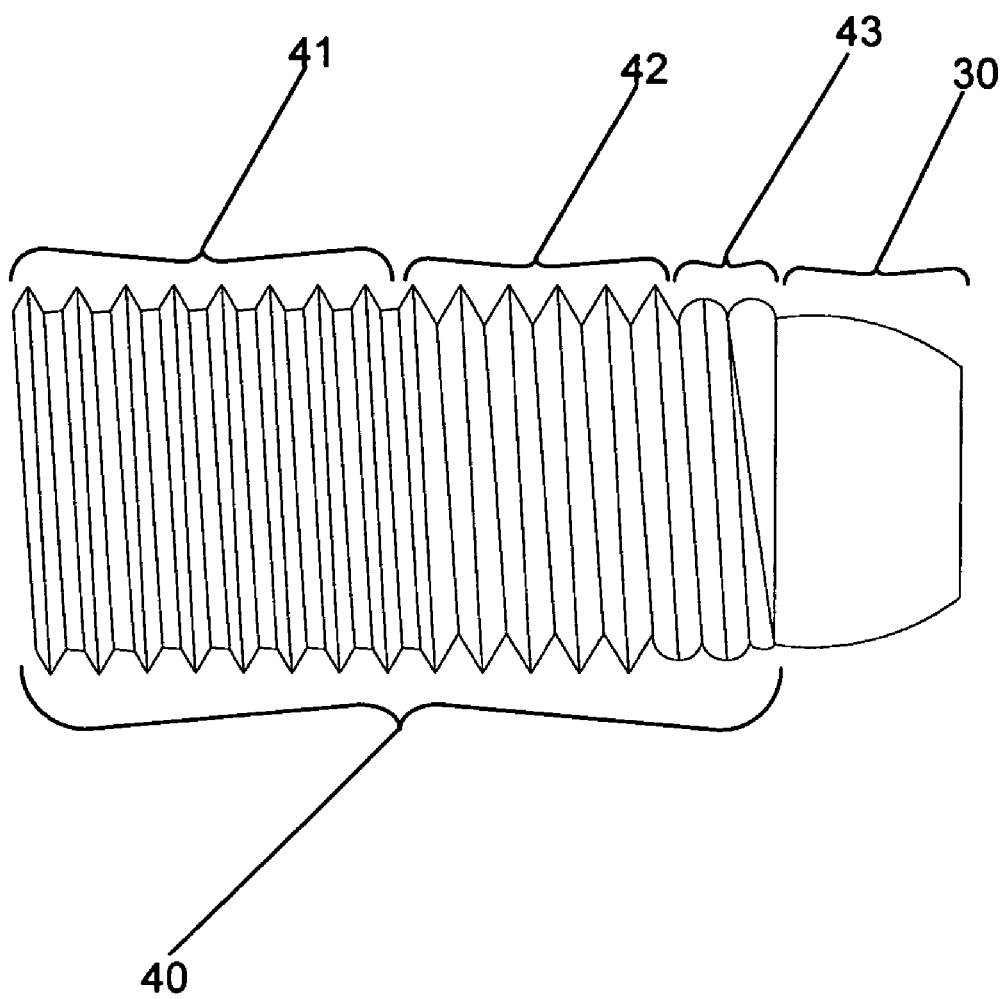
FIG. 4 depicts a close up view of a threaded surface on an end of the u-bolt of the preferred embodiment.
Figure 5:
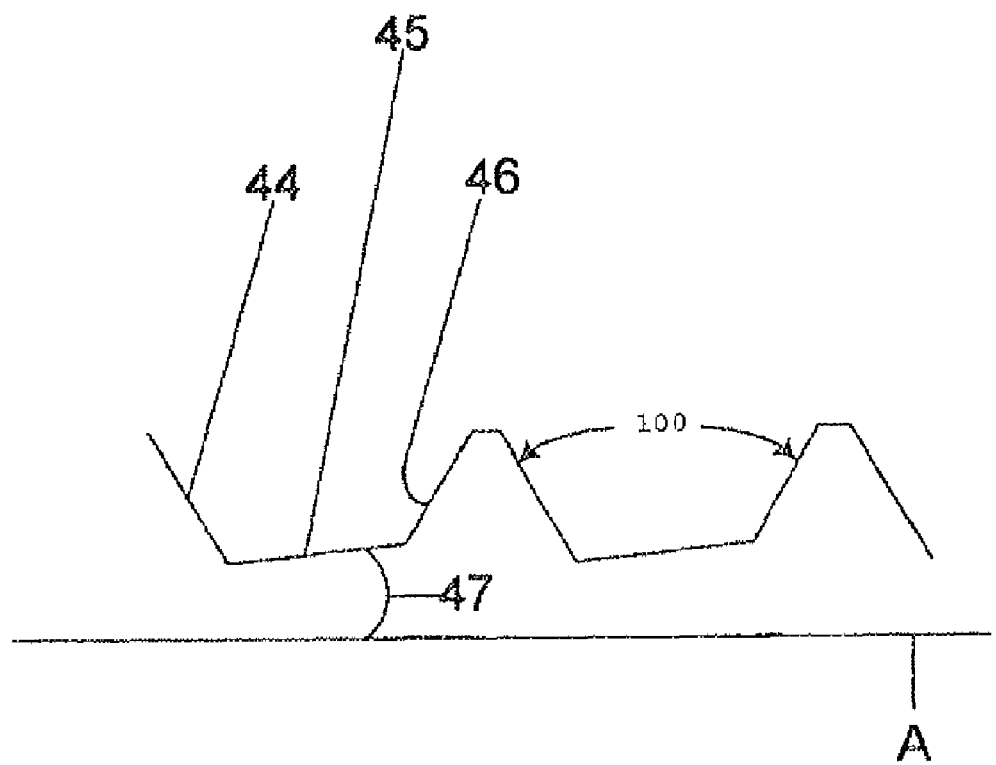
FIG. 5 depicts a close up view of a locking thread on the u-bolt of the preferred embodiment.
Figure 6:
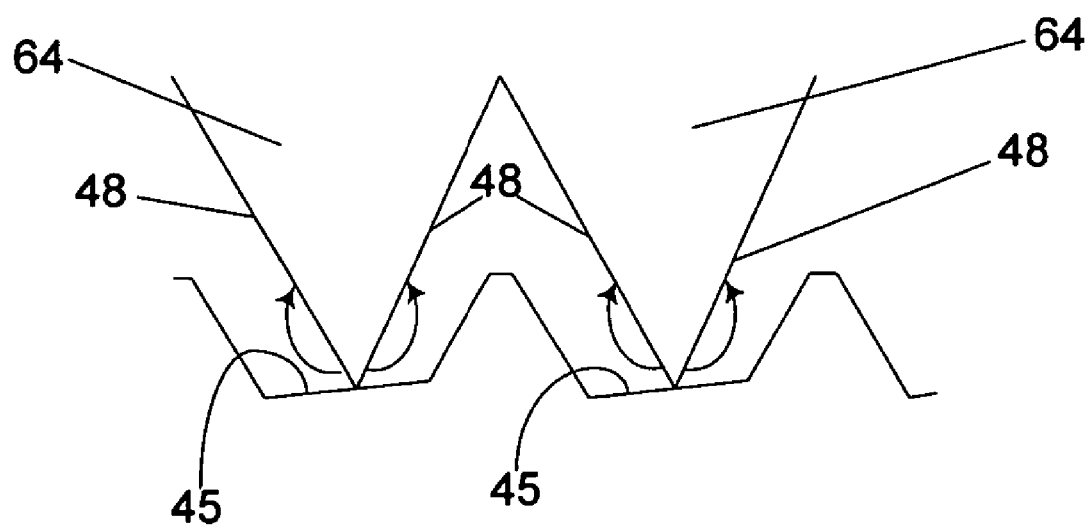
FIG. 6 depicts a close up view of the locking threads cooperating with the threads of a nut body.

FIG. 4 depicts the threaded surface 40 in greater detail. As shown therein, the threaded surface 40 is provided with a plurality of thread configurations 41, 42, 43. The threaded surface 40 is provided with a locking thread 41. FIG. 5 depicts a cross-sectional view of a plurality of locking threads 41 in greater detail. As depicted in FIG. 5, the locking thread 41 is provided with a plurality of angled surfaces 44, 46. In the preferred embodiment, the locking thread 41 is provided with a first angled surface 44 and a second angled surface 46. Advantageously the first angled surface 44 is at an angle 100 with respect to the second angled surface 46 ranging between 30° to 70°, preferably 60°.

Located between the first angled surface 44 and the second angled surface 46 is a root surface 45. The root surface 45 of the locking thread 41 includes a root diameter. The root surface 45 is at an angle 47 with respect to an imaginary horizontal line A running along the axis of the shaft 20. Preferably, the angle 47 is between 4° and 8°. The root surface 45 has a width that is greater than that found in a conventional thread and is configured so that the locking thread 41 converges to the head 56.

The locking thread 41 is configured to cooperate with the threads 64 of a nut body 52, also referred to herein as a female threaded member. As the nut body 52 is torqued onto the shaft 20, the root surfaces 45 within the locking threads 41 exert a force on the threads 64 of the nut body 52. As depicted in FIG. 4, in cases where the threads 64 of the nut body 52 include a metal, the root surface 45 exerts a force upon the thread 64 of the nut body 52 so that the metal flows upward on a flank 48 of the thread 64.

Figure 7:
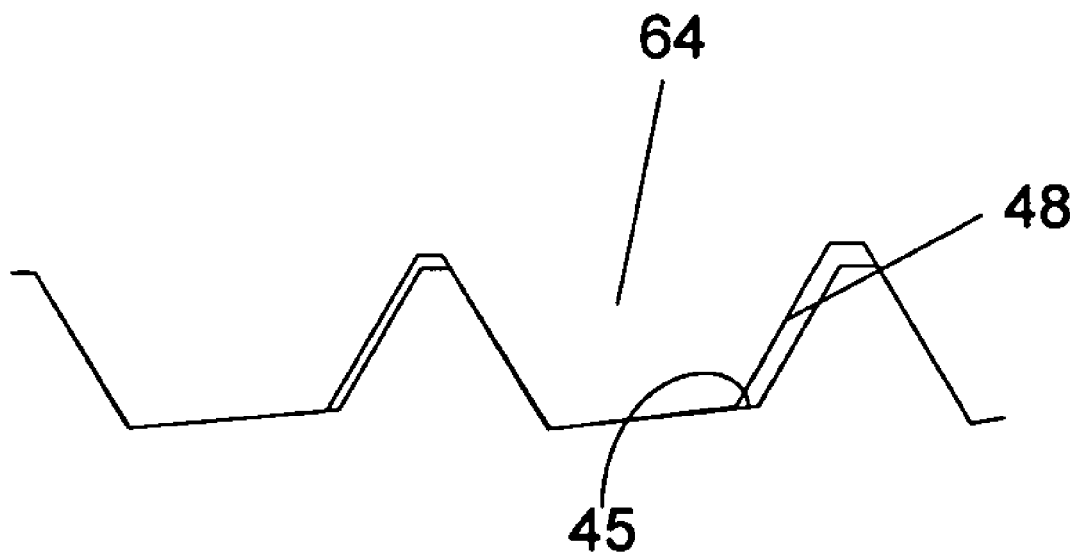
FIG. 7 depicts a close up view of the locking threads cooperating with the threads of a nut body.

Referring now to FIG. 7, the threads 64 of the nut body 62 are re-formed so that the threads 64 generally conform to the configuration of the locking thread 41. As depicted in FIG. 7, the flank 48 of the thread 64 of the nut body 62 is re-formed so that it is in contact with at least one of the angled surfaces 44, 46 of the locking thread 41. FIG. 7 further depicts the threads 64 of the nut body 62 re-formed so that a greater surface area is in contact with the root surfaces 45 on the end 20.

Figure 8:
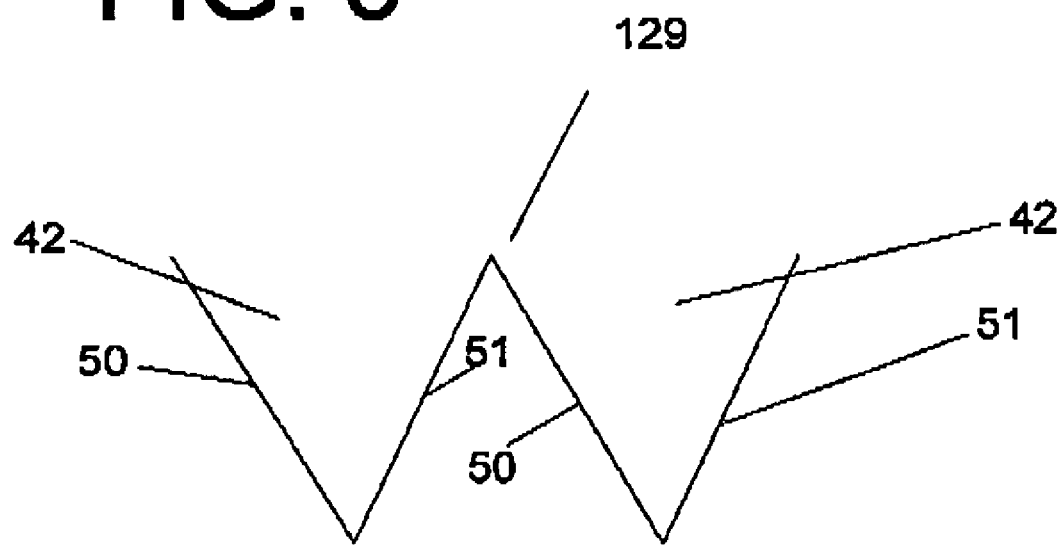
FIG. 8 depicts a close up view of the Vee-shaped threads on the u-bolt of the preferred embodiment.

As depicted in FIG. 4, a plurality of Vee-shaped threads 44, also referred herein as conventional threads, are located adjacent to the plurality of locking threads 41 and provided with a thread root 129. The Vee-shaped threads 44 include a root diameter and a crest diameter. As depicted in FIG. 2, the root diameter of the locking thread 41 is greater than the root diameter of the Vee-shaped threads 44. A cross-sectional view of a plurality of Vee-shaped threads 42 is depicted in greater detail in FIG. 8. As shown therein, a Vee-shaped thread 42 is provided with a first side 50 and a second side 51. The sides 50, 51 abut one another and are configured to form a Vee shape. The first side 50 is at an angle with respect to the second side 51, preferably ranging between 30° and 90°.

Figure 9:
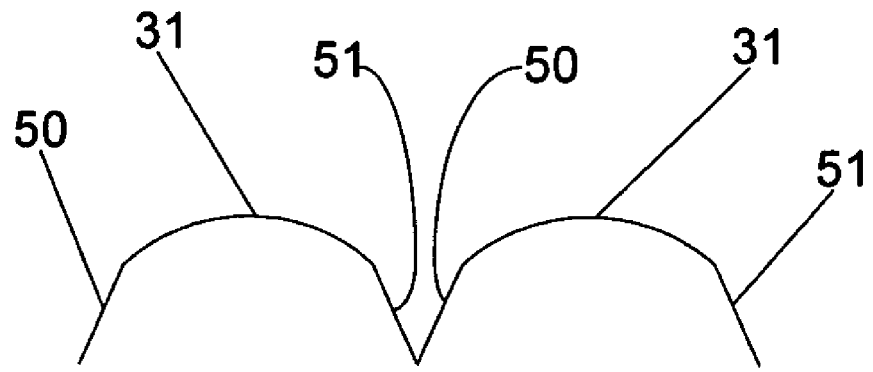
FIG. 9 depicts a close up view of the curved threads on the u-bolt of the preferred embodiment.

FIG. 4 further depicts a plurality of curved threads 43 located adjacent to the Vee-shaped threads 42. In this application, the term curved threads 43 is also referred to herein as guide threads. FIG. 9 depicts a cross-sectional view of a plurality of curved threads 43 in greater detail. According to one aspect of the present invention, the curved threads 43 are configured to prevent cross-threading. According to another aspect of the present invention, the curved threads 43 are configured to orient the threads 64 of a nut body 52 so that the threads 64 align with the threaded surface 40 on the shaft 20.

Figure 10:
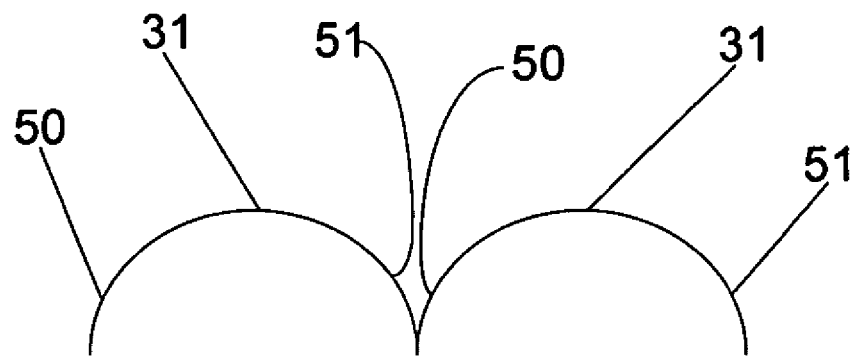
FIG. 10 depicts a close up view of the curved threads on the u-bolt of an alternative embodiment.

As shown in FIG. 9, the curved threads 43 are provided with at least one curved surface 31. In the preferred embodiment, the curved threads 43 are provided with a first side 50 and a second side 51. The curved surface 31 is located between the first side 50 and the second side 51. As shown in FIG. 9, the first side 50 is at angle with respect to the second side 51, preferably ranging between 30° and 90°. Alternatively, as shown in FIG. 10, the first and second sides 50, 51 are curved.

Figure 11:
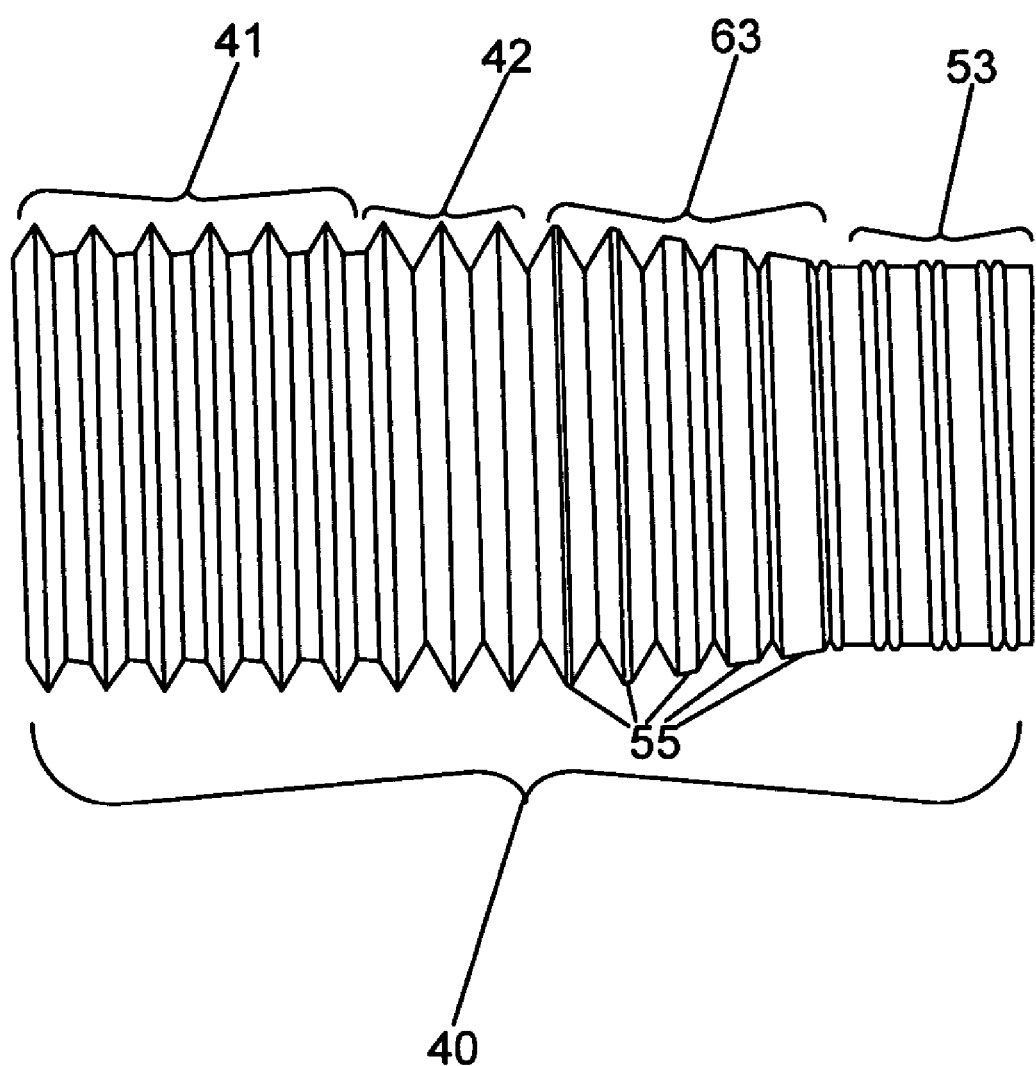
FIG. 11 depicts a close up view of the threaded surface on the u-bolt of an alternative embodiment.

FIG. 11 depicts a cross-sectional view of an alternative threaded surface 40. As shown therein, the threaded surface 40 includes a plurality of guide threads 53. The guide threads 53 include a crest diameter. As illustrated in FIG. 4 and FIG. 11, the guide threads 43, 53, 63, differ from the conventional threads on the shaft 20 in that the conventional threads are provided with a crest diameter (referred to herein as a "first crest diameter") that is, at least in part, greater than a crest diameter of the guide threads (referred to herein as a "second crest diameter"). According to one aspect of the present invention, the guide threads 53 are configured to prevent cross-threading. According to another aspect, the guide threads 53 are configured to orient the threads 64 of a nut body 52 so that the threads 64 align with the threaded surface 40 on the shaft 20. As shown in FIG. 9, the guide threat 53 are located at an end of the shaft 20 and are provided with a reduced diameter relative to the Vee-shaped threads 42. In this application, the term "guide means" refers to threads on a shaft 20 that have a crest diameter that is, at least in part, less than the crest diameter of the conventional thread on the shaft 20. Guide means encompasses structures on a shaft 20 that generally align the threads of the shaft 20 with those of a female threaded member.

A plurality of plateau threads 63 are located adjacent to the guide threads 53. In this application, the term plateau threads 63 is also referred to herein as guide threads. As depicted in FIG. 11, the plateau threads 63 are provided with a plurality of plateaus 55. The plateaus 55 are shaped to prevent cross-threading and to orient the nut body so that the threads 64 align with the threaded surface 40 on the shaft 20. In the embodiment depicted in FIG. 11, the plateaus 55 are conically or frusto-conically shaped, preferably to provide a ramped cross-sectional profile.

Figure 12:
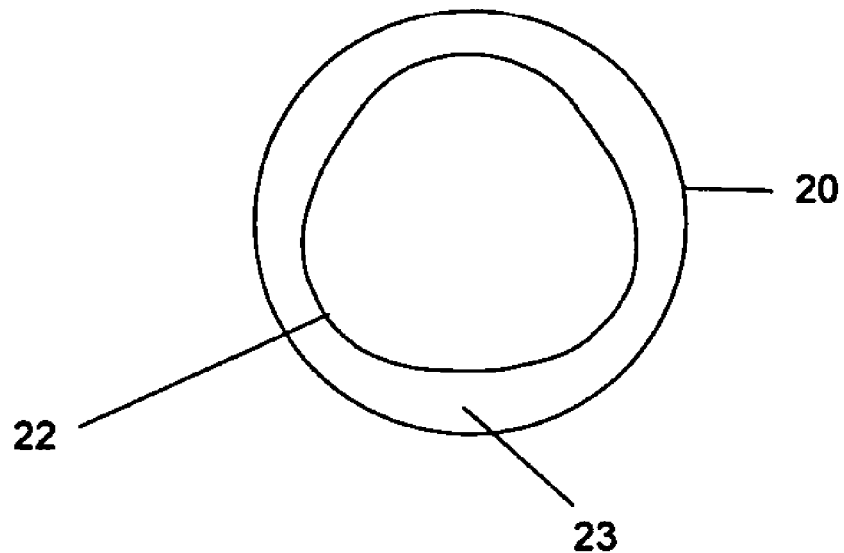
FIG. 12 depicts a bottom plain view of a end on the u-bolt of the presently preferred embodiment.

Referring now to FIG. 12, a bottom cross-sectional view of the end 20 is shown. The end 20 is advantageously provided with a trilobular shape; however a circular or ovular shape could be used.

The u-bolt 5 is fabricated through a plurality of processes. According to one aspect of the present invention, the u-bolt 5 is machined. According to another aspect of the present invention, the u-bolt 5 is hot formed or forged. According to yet another aspect of the present invention, the u-bolt 5 is fabricated through casting. According to still another aspect of the present invention, the u-bolt is warm formed or forged. The preferred embodiment of the present invention is cold formed or forged (also known as "cold head").

Figure 13:
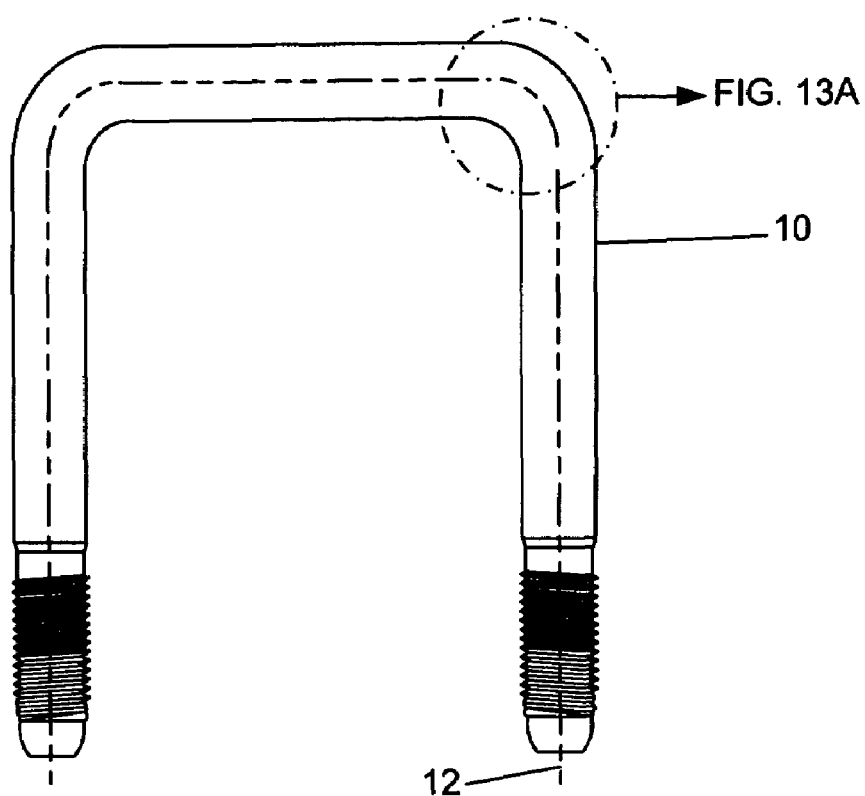
FIG. 13 depicts a side elevational view of the longitudinal axis on a u-bolt.
Figure 13A:
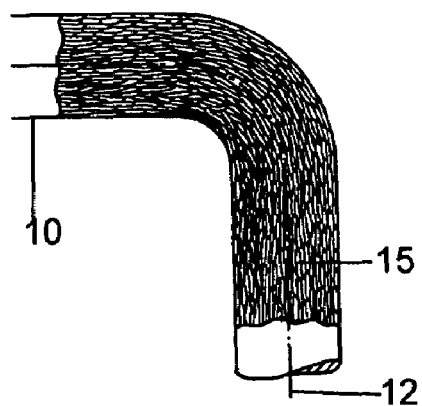
FIG. 13A depicts a close up view of the steel grains and the longitudinal axis on a u-bolt.

In the preferred embodiment the u-bolt is fabricated from steel having a preferred orientation or texture. The u-bolt 5 depicted in FIGS. 13 and 13A is provided with a longitudinal axis 12. The u-bolt 5 is made of high strength steel having steel grains 15 with a preferred orientation or texture. In the preferred orientation, the steel grains 15 of u-bolt 5 are substantially parallel to the longitudinal axis 12 (see FIG. 13A).

U-bolts according to one embodiment of the present invention are made from blanks of high strength steel having grains with a texture parallel to the longitudinal axis of the blank such that the orientation of these textured grains will be substantially parallel to the resulting u-bolt's longitudinal axis after either cold or warm forming. In another embodiment, the u-bolts are made from blanks of high strength steel having grains with a random orientation such that only the grains which are deformed during the forming operation (i.e., from blank to u-bolt) are textured.

In most forms, u-bolts according to the present invention are formed from blanks of high strength steel having a yield strength of at least about 90,000 psi, and preferably at least about 130,000 psi, and a tensile strength of at least about 120,000 psi, and preferably at least about 150,000 psi. Such blanks are then either cold formed at a temperature of less than 300 degrees F. or warm formed within a temperature range from about 300.degrees F. up to about the steel's recrystallization temperature into u-bolts with predetermined geometric configurations.

Whatever forming temperature is used, detrimental recrystallization should be avoided. Forming (i.e., permanently deforming) the blank at a temperature which avoids complete recrystallization produces a u-bolt with steel grains having a preferred orientation or texture. In an alternative embodiment, the method of the present invention for making high strength steel u-bolts includes providing a blank of high strength steel having the yield and tensile strength as given above and a preferred orientation which is parallel to the longitudinal axis of the blank.

The temperature at which the u-bolt is formed is related to the chemical composition of the steel used. When the blank is cold formed into a u-bolt, the high strength steel may be exemplified by the following composition, by weight percent:

carbon: about 0.30 to about 1%;
manganese: about 2.0 to about 2.5%;

vanadium: up to about 0.35%; and
iron balance.

In a more preferred form, the high strength steel has the following composition, by weight percent:
carbon: about 0.50 to about 0.55%;
manganese: about 2.0 to about 2.5%;
vanadium: up to about 0.03% to about 0.15; and
iron balance.

When a warm forming process is used, the high strength steel may be exemplified by the following composition, by weight percent:
carbon: about 0.30 to about 0.65%;
manganese: about 0.30 to about 2.5%;
vanadium: up to about 0.35%
iron balance.

In a more preferred form, the high strength steel has the following composition, by weight percentage:
carbon: about 0.50 to about 0.55%;
manganese: about 1.20 to about 1.65%;
vanadium: about 0.03 to about 0.15%
iron balance.

In the above compositions, columbium, silicon, and aluminum may be substituted in whole or in part for vanadium; however, vanadium is preferred for strength and ductility purposes.

When the blank is cold formed into a u-bolt according to the present invention, the yield strength and tensile strength of the u-bolt are substantially the same or greater than the blank and no subsequent annealing step is required. When the blank is warm formed or cold formed into a u-bolt, the u-bolt thus produced needs no further strengthening.

Most commercially available steels are polycrystalline (i.e., made of many crystals or grains). Each crystal or grain has metal atoms which are arranged in a pattern which is generally repeated throughout the grain (i.e., crystal structure). The grains of a steel part can have a random orientation, a preferred orientation, or a combination of both, depending on a number of factors, including the temperature at which the steel is formed.

When steel is hot formed, such as by hot forging, the grains of the steel are provided with a random orientation. Steel is hot formed when it is plastically or permanently deformed above its recrystallization temperature. Forming above the recrystallization temperature not only prevents the formation of textured grains but also eliminates any preexisting texturing. That is, the orientation of each grain's crystal structure differs from grain to grain. Such a random orientation typically results in the mechanical properties of the steel being isotropic (i.e., having the same properties in all directions).

In contrast to hot forming, cold forming or warm forming a steel causes the crystal structure of the affected steel grains (i.e., those grains which are permanently deformed) to orient themselves according to the way they are deformed (i.e., in a preferred orientation). With warm forming, the steel is generally preheated to a temperature below its recrystallization temperature before being permanently deformed. Cold forming is generally performed at about room temperature up to about 300 degrees F. Warm forming or cold forming generally results in the mechanical properties of at least the deformed portion of the steel being anisotropic in nature. Grains which are textured are stronger (i.e., have a higher modulus of elasticity) along the direction of the preferred orientation than grains having a random orientation.

For example, cold rolling or extruding a blank of steel bar stock will cause the grains of the steel bar to elongate and reorient themselves into a preferred orientation which is parallel to the longitudinal axis of the bar stock (see FIG. 13A). Such an orientation will result in the bar being strongest along its longitudinal axis. Therefore, a forming operation which either imparts a texture to the high strength steel grains or leaves previously textured grains intact is desirable. Cold or warm forming not only allows preexisting textured grains to be retained, but such treatment may impart additional texturing.

The blank of high strength steel which is used as the starting piece in the present invention is produced by any suitable method known in the art. In-one form, the high strength steel of the blank used for making u-bolts according to the present invention has been hot reduced and cold drawn to provide the blank with the yield strength and tensile strength stated above as well as grains with a preferred orientation parallel to the longitudinal axis of the blank. An example of such a method is disclosed in U.S. Pat. No. 3,904,445 to the Hugh M. Gallagher, Jr., the disclosure of which in its entirety is incorporated herein by reference.

The '445 patent discloses a processing sequence to produce a high strength steel bar stock of the type particularly useful for producing threaded fasteners, including U-bolts. In the disclosed process, a steel, having chemistry falling within certain disclosed ranges, is subjected to a standard hot reducing operation to within 10%-15% of final gauge. The hot reduced bar stock is then cut or severed into individual lengths for rapid air cooling. At this point, the bar stock produced has a fine grain structure between about ASTM No. 5-8, with the grains having a random orientation. Thereafter, the individual lengths of hot reduced bar stock are subjected to a cold forming operation to final gauge. The final step is a controlled stress relieving step to reduce residual stresses built up from the cold finishing. The stress relieving leaves the mechanical properties of the metal relatively unchanged. This stress relieving step comprises heating the lengths of bar stock to between about 500.0 degree.-850.0 degree. F. for about one hour, but may or may not be necessary. Thus, such bar stock may be used to form the starting blank of high strength steel for making a u-bolt according to the present invention.

In other forms, the high strength steel of the blank used for making u-bolts according to the present invention has been provided with the yield strength and tensile strength stated above but not grains with a preferred orientation parallel to the longitudinal axis of the blank. However, because cold and warm forming can strengthen the steel at the location of the permanent deformation, even a blank or bar of steel initially having randomly oriented grains can be strengthened by cold or warm forming at the portion or segment which is permanently deformed. Thus, a steel bar or blank, with a random grain orientation, which is permanently bent by cold or warm forming can be stronger along the curved portion than at any other point along its length. Likewise, a steel bar with grains having a preferred orientation parallel to the bar's longitudinal axis which is permanently bent by cold or warm forming can also be stronger along the curved portion than at any other point along its length. When the bar is bent, the textured grains of the steel bar also curved portion, following the longitudinal axis (see FIG. 13A). For any given degree of permanent deformation, however, cold forming has a greater strengthening effect than warm forming.

Cold forming a curved portion in a length of bar stock is less severe than other cold forming techniques, such as upsetting or extruding, which may cause cracks or fractures in the finished u-bolt. Consequently, in the preferred embodiment, the blank is provided with a composition that is better suited to being subjected to cold forming techniques, such as upsetting or extruding. This method for making a high-strength u-bolt includes providing a blank of high-strength steel material having a microstructure of fine pearlite in a ferritic matrix, a tensile strength of at least about 120,000 psi and preferably at least about 150,000 psi, and a yield strength of at least about 90,000 psi, and preferably at least about 130,000 psi. Pearlitic constituents are generally considered to be "fine" when their lamellae are not resolvable at an optical magnification of about 1000 times.

In one form, the high-strength steel material utilized as the blank has been hot reduced and cold drawn to provide the blank having the mechanical properties of tensile strength and yield strength stated above.

The high-strength steel material used to make the blank has the following composition, by weight percent:
carbon about 0.30 to about 0.65%;
manganese about 0.30 to about 2.5%;
at least 1 ferrous grain refiner from the group consisting of aluminum, niobium, titanium and vanadium, and mixtures thereof, in an effective amount up to about 0.35%; and
iron balance.

In a more preferred form, the high-strength steel material has the following composition, by weight percent:
carbon about 0.40 to about 0.55%;
manganese about 0.30 to about 2.5%;
at least 1 ferrous grain refiner from the group consisting of aluminum, niobium, titanium and vanadium and mixtures thereof, in an effective amount up to about 0.20%; and
iron balance.

In a still more preferred form, the high-strength steel material has the following composition, by weight percent:
carbon about 0.50 to about 0.55%;
manganese about 1.20 to about 1.65%;
at least 1 ferrous grain refiner from the group consisting of aluminum, niobium, titanium and vanadium, and mixtures thereof, in an effective amount from about 0.03 to about 0.20%; and
iron balance.

In a further preferred form, the high-strength steel material has the following composition, by weight percent:
carbon: about 0.50 to about 0.55%;
manganese: about 1.20 to about 1.65%;
at least 1 ferrous grain refiner from the group consisting of aluminum, niobium, titanium and vanadium, and mixtures thereof, in an effective amount from about 0.03 to about 0.15%; and
iron balance.

While aluminum, niobium (i.e., columbium), titanium, and vanadium act as grain refiners, vanadium is the most preferred of the grain refiners. Furthermore, it should be understood that the compositions listed and claimed herein may include other elements which do not impact upon the practice of this invention.

The blank, having a composition and mechanical properties of tensile strength and yield strength as given above is thereafter cold formed using such techniques as roiling, upsetting, forging, or extrusion at a temperature between ambient or room temperature up to less than about 300.degree. F., and preferably at about ambient temperature, to provide a u-bolt 5 having a desired geometric configuration, whereby the mechanical properties of tensile strength and yield strength of the u-bolt 5 are substantially the same or greater than the blank. The formed u-bolt 5, with the mechanical properties of tensile strength and yield strength given, is preferably produced without the need for further processing steps, such as a final stress relieving step, to improve toughness. However, for certain applications of the u-bolt, a stress relieving step may be necessary.

The blank of high-strength steel material having a tensile strength of at least about 120,000 psi and a yield strength of at least 90,000, which is used as the starting piece in the present invention, is produced by any suitable method known in the art. One such method is disclosed in the '445 patent. Thus, such bar stock, with and without further stress relieving may be used to form the starting high-strength steel blank for this alternative method.

The preferred process of cold forming the u-bolt begins with a blank fabricated in accordance with the aforementioned preferred method. The blank is upset by being rolled or run through a series of dies or extrusions which elongate the blank into a rod that is provided with a generally cylindrical shape. Then, the portion of the rod that is to be used as the end 20 is extruded to have a trilobular cross section. Then the threads 40 are rolled with a sectional die. Preferably, the curved threads 43 are rolled first. Then, the Vee-shaped threads 42 are rolled. Finally, the locking threads 41 are rolled. Subsequently, the rod is bent to form a u-bolt with the desired geometric configuration.

In an alternative process, the u-bolt begins with a blank fabricated in accordance with the aforementioned alternative method. The blank is cold formed or warm formed and upset by being rolled, which elongates the blank into a rod that is provided with a generally cylindrical shape. Then the threads 40 are rolled with a sectional die. Preferably, the curved threads 43 are rolled first. Then, the Vee-shaped threads 42 are rolled. Finally, the locking threads 41 are rolled. Subsequently, the rod is bent to form a u-bolt with the desired geometric configuration.

In another alternative process the cold forming of the u-bolt begins with a metal wire or metal rod which is drawn to size to provide a blank. After the wire or rod is drawn to size, the blank is upset by being rolled or run through a series of dies or extrusions which elongate the blank into a rod. Then, the portion of the rod that is to be used as the end 20 is extruded to have a trilobular cross section. Then the threads 40 are rolled with a sectional die. Preferably, the curved threads 43 are rolled first. Then, the Vee-shaped threads 42 are rolled. Finally, the locking threads 41 are rolled. Subsequently, the rod is bent to form a u-bolt with the desired geometric configuration.

In the case of a carbon steel being used as a material in the u-bolt 5, it is desirable to heat treat the u-bolt 5 through a quench and temper. In the case of a stainless steel being used, such as A286, it is desirable to put the u-bolt 5 through a solution anneal and then age hardening in a furnace via ASTM A453.

To finish the u-bolt 5, it is coated with a low friction coating via a dip and spin. However, a plating, an organic coating, PTFE, a dacromet coating, an inorganic coating, dorraltone, a zinc coating, such as an electro zinc coating, a coating containing phosphate and oil, a ceramic coating, or a coating of waxes and oils may all be used.

Figure 14:
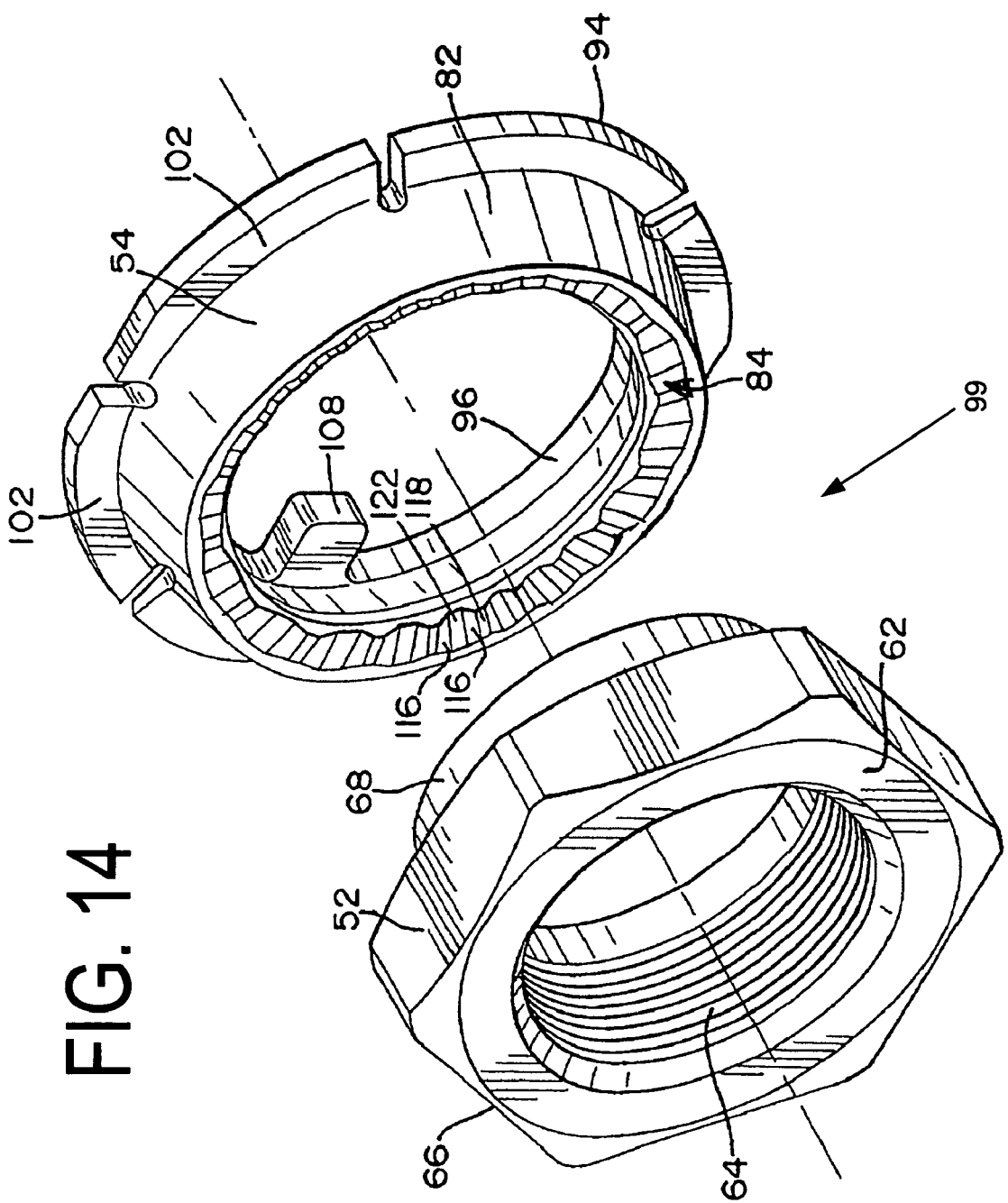
FIG. 14 is an exploded perspective view of a nut-washer assembly.

The u-bolt 5 is configured to operate with a nut 52 or a nut-washer assembly 99. Referring now to FIG. 14, the presently preferred embodiment of the nut-washer assembly 99 is depicted. As depicted therein, the nut-washer assembly 99 is provided with a nut 52. The nut 52 is preferably fabricated from steel, preferably a carbon steel, such as 1020 to 1045 steel.

The nut 52 is preferably forged. The steel is first heated to 2100° F., cut into segments, and pressed so that it is circular and larger in diameter. Then a portion of the inner surface and a torque transmitter 66 are forged. Thereafter, another portion of the inner surface is punched out and the nut 52 is then heat treated to an average hardness ranging between 26 and 36 on the Rockwell C scale, preferably 31.

The washer 54 is preferably fabricated from an alloy grade steel, such as 4140 steel. However, those skilled in the art will appreciate that a medium carbon steel such as 1020 to 1045 steel may be used. Similar to the nut 52, it is preferred that the washer 54 be fabricated through forging. The steel is first heated to 2100° F., cut into segments, and pressed so that it is circular and larger in diameter. Then, an annulus is formed and punched out. The washer 54 is heat treated to an average hardness ranging between 28 and 42 on the Rockwell C scale, preferably 36.

The nut 52 and washer 54 are assembled together. The nut 52 is mated with the washer 54 and then a collar on the nut is flared out. Those skilled in the art will appreciate that the flare provides a lead for the threads. Then, a tap is sent down through the nut 52, and threads are cut into the nut 52. The threads preferably have a diameter in the range of M8 up to an M30.

The nut 52 and/or the washer 54 may advantageously be provided with a coating. Preferably, the coating is of a formulation that prevents rust and/or corrosion; however, other coatings may be used. By way of example, and not limitation, the coating may be a formulation that reduces friction. In one embodiment, the coating reduces friction between the nut and the washer. In another embodiment, the coating reduces friction within the threads.

Those skilled in the art will appreciate that various chemical compounds may be used as suitable coatings. In one embodiment, polytetrafluoroethylene or PTFE is used. In another embodiment, a zinc coating is used. In yet another embodiment, a water-based coating dispersion containing metal oxides and/or aluminum flakes is used.

In the preferred embodiment the nut 52 is provided with a nut body 62. As depicted in FIG. 14, the nut body 62 is internally threaded at 64. The internal threads at 64 preferably extend to an internal portion of a skirt 68.

The nut body 62 is provided with a plurality of curved and flat surfaces. As shown in FIG. 14 externally around the periphery of the nut body 62 is a torque transmitter 66. The torque transmitter 66 of the preferred embodiment comprises a plurality of surfaces. As depicted in FIG. 14, the plurality of surfaces are arranged in the preferred hexagonal shape.

Figure 15:
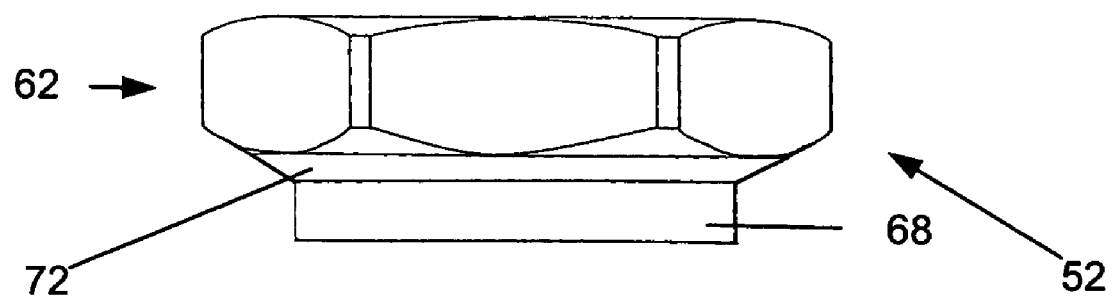
FIG. 15 is a side elevational view of a nut.

The nut body 62 is provided with an annular surface 72. The annular surface 72 is located at the bottom of the nut body 62, above a skirt 68. Referring now to FIG. 15, the annular surface 72 is preferably generally frusto-conical in shape. However, those skilled in the art will appreciate that the annular surface 72 can be spherically concave, spherically convex, or flat, without departing from the scope of the invention. By way of example and not limitation, the annular surface 72 can be flat where the application does not require a washer 54.

The annular surface 72 can be fabricated using any desired technique. In the preferred embodiment, the annular surface 72 is preferably fabricated by cold forging. The cold forging is preferably accomplished through the use of a die insert. The die insert is preferably machined to the desired shape using conventional ball end mill techniques.

Figure 16:
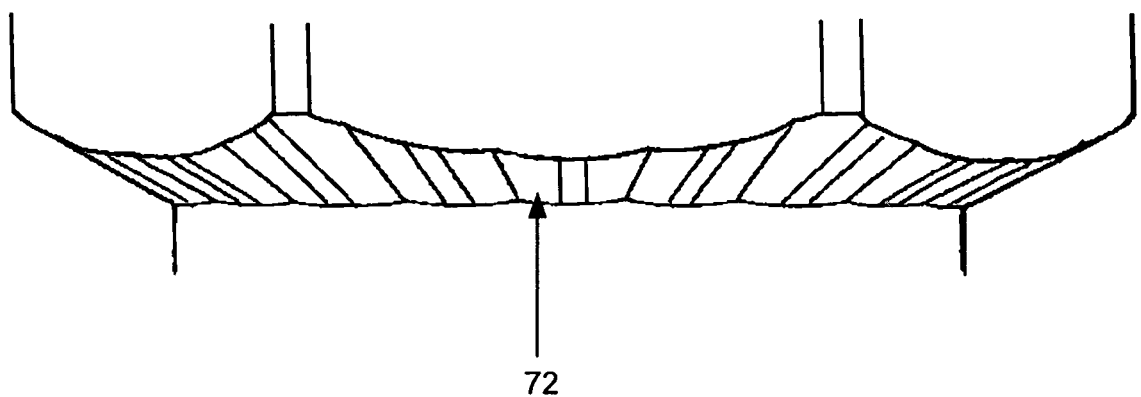
FIG. 16 is a close up side elevational view of a nut.

In an alternative embodiment the annular surface 72 is undulating in shape. The annular surface 72 of this embodiment is configured to cooperate with a bearing surface 84. As depicted in FIG. 16, the annular surface 74 is undulating in shape. The annular surface 72 therein is provided with an annularly extending series of surfaces, which provide a uniform undulation around the entire annular surface 72.

Figure 17:
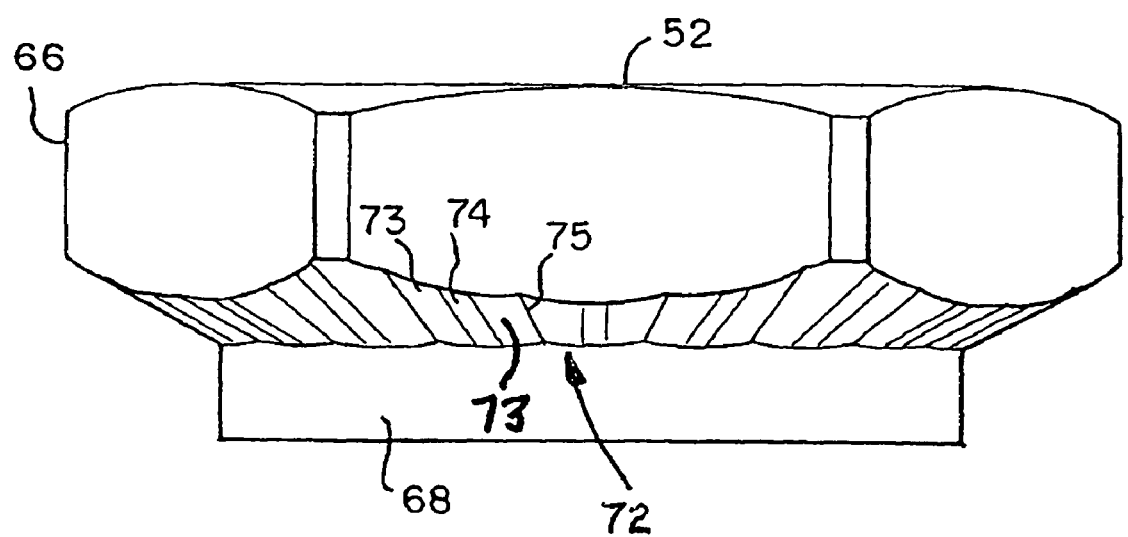
FIG. 17 is a side elevational view of a nut.
Figure 18:
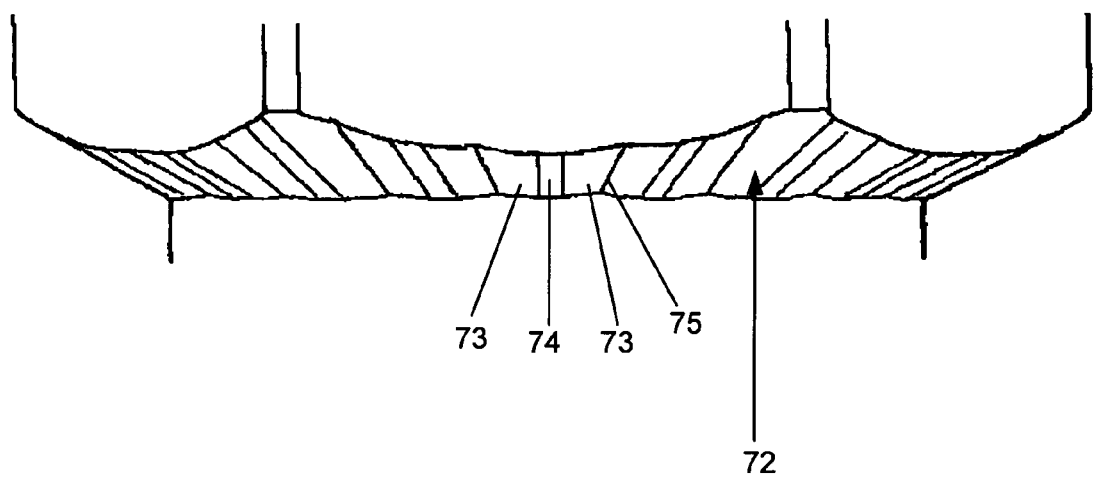
FIG. 18 is a close up side elevational view of a nut.

FIGS. 16 and 17 depict yet another alternative embodiment of the present invention. As depicted therein, the annular surface 72 is provided with a plurality of lower peaks. The lower peaks are provided as plateaus 74.

The plateaus 74 are preferably generally spherically convex. The plateaus 74 are provided with the same radius as the valleys 122 on the bearing surface 84 on the washer 54. The plateaus 74 are formed in the cold forging process so that they are all convex and lie on the surface of an imaginary sphere whose center is on the axis of the nut body 62. The radius of that sphere ranges from 0.1 inches to 2.00 inches.

The plateaus 74 are adjacent to a plurality of faces 73. Each plateau 74 is adjacent to a pair of faces 73 that are oppositely inclined. The annular surface 72 of this alternative embodiment is provided with an annularly extending series of faces 73, which form a uniform undulation around the entire surface. The faces 73 are configured to be complementary with corresponding faces 116 on the bearing surface 84 on the washer 54. The faces 73 are provided with the same radius as the faces 73 on the bearing surface 84.

As depicted in FIGS. 16 and 17, the faces 73 are preferably generally spherically convex. Each face 73 is formed so that it is convex and is curved both radially and circumferentially with respect to the nut body 62.

Each face 73 is adjacent to a valley 75. Each valley 75 is adjacent to a pair of faces 73. The valleys 75 are configured to be narrower than valleys 122 on the bearing surface 84. As depicted in FIGS. 16 and 17, the valleys 75 are generally spherically convex and have a predetermined depth. In one embodiment, the depth is dimensioned according to the number of threads on the nut.

The valley 75 and adjacent faces 73 of the alternative embodiment provide a generally inverted Vee-shape profile. The Vee-shaped profile provides the plateaus 74 with a height. Advantageously, the height is dimensioned according to the distance between the plateau segment 74 and the valley 75. In the embodiment shown herein, the height equals the vertical distance between the plateau 74 and the valley 75. The height is preferably slightly greater than the clearance between the threads at 64 and those on a end, such as end 20 or 21, when the fastener assembly 50 is in place. In this alternative embodiment, the height ranges between 0 inches and 0.030 inches In an alternative embodiment, the height is dimensioned according to the number of threads, measured axially, per inch on the nut. Advantageously the height is related to the number of faces 73 or faces 116. By way of example and not limitation the height, in inches, is proportional to the number of threads per inch and the number of Vee-shaped undulations. In the preferred embodiment, the height is proportional to the product of the number of threads per inch and the number of Vee-shaped undulations. The height of this alternative embodiment ranges up to approximately 0.04167 of an inch.

The nut 52 is preferably provided with a skirt 68. The skirt extends axially away from the nut body 62 at the inner end of internal threads 64. The skirt 68 is configured to cooperate with a washer 54. The skirt 68 is shaped to retain a washer 54 in a loose relationship. In the preferred embodiment, the skirt 68 is adapted to extend axially from the annular surface 72 into the generally cylindrical washer body 82 whereupon a collar 85 is formed outwardly under an undercut shoulder within the washer body 82 to loosely but securely hold the washer 54 and nut 52 together.

Figure 19:
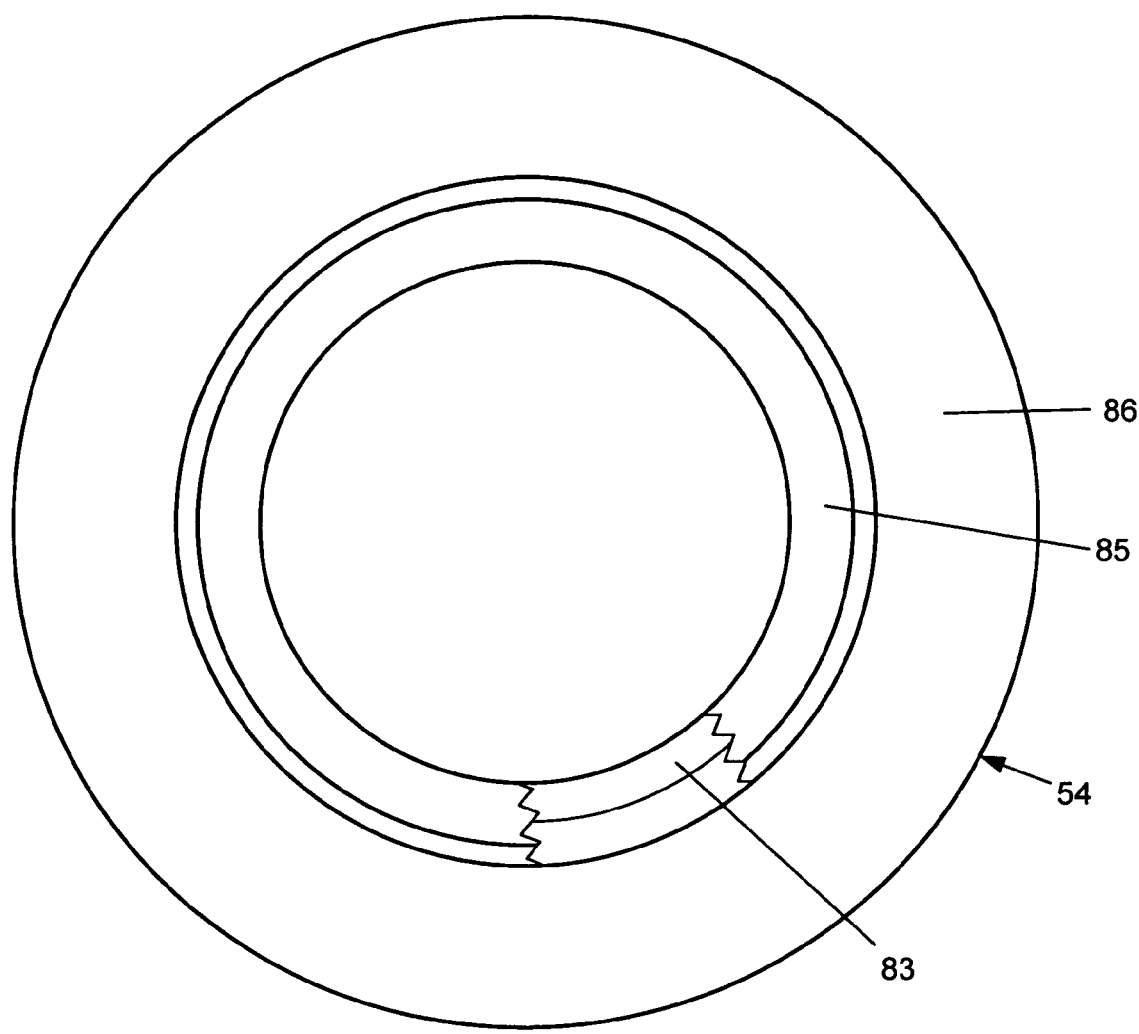
FIG. 19 is a bottom plain view, partially in section, of a nut and washer.

As shown in FIG. 17, depending from the nut body 62 is a uritarily formed annular skirt 68. As shown in FIG. 19, the skirt 68 is provided with a collar 85 that functions to retain the washer 54. Those skilled in the art will appreciate that, for an application that does not require a washer 54, the nut 52 can be fabricated without the skirt 68 without departing from the scope of the present invention.

Referring now to FIG. 14, the presently preferred embodiment of the nut-washer assembly 99 is depicted. As depicted therein the nut-washer assembly 99 is provided with a washer 54. The washer 54 is preferably fabricated from steel. The steel is preferably medium carbon steel. The steel is preferably forged and then heat treated to an average hardness of 33 on the Rockwell C scale As shown in FIG. 14, the washer 52 is provided with a washer body 82. In the preferred embodiment, the washer body 82 is generally annular in shape. As shown in FIG. 14, a portion of the washer body 82 is generally cylindrical.

The washer body 82 is provided with a bearing surface 84. The bearing surface 84 can be fabricated using any desired technique. The bearing surface 84 is preferably fabricated by cold forging. The cold forging is preferably accomplished through the use of a die insert. The die insert is preferably machined to the desired shape using conventional ball end mill techniques.

Figure 20:
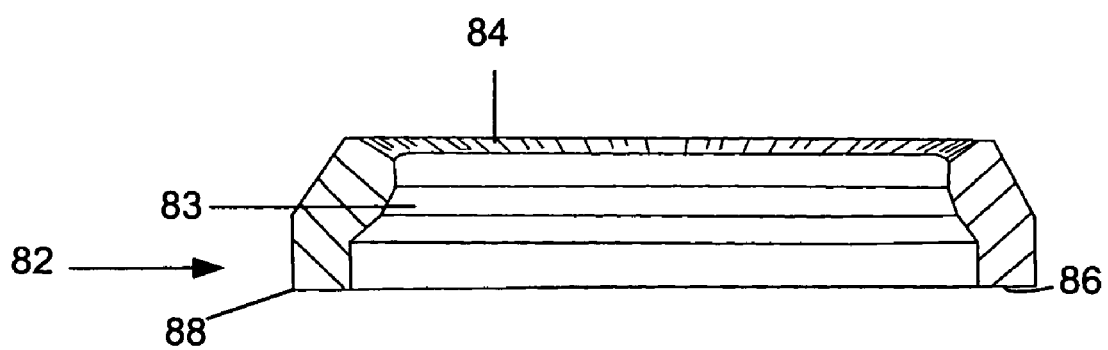
FIG. 20 is a side elevational view, partially in section, of a washer.

As depicted in FIG. 20, the bearing surface 84 is preferably located on the inner end of the washer body 82. As depicted therein, the bearing surface 84 is preferably generally frusto-conical in shape. However, those skilled in the art will appreciate that the bearing surface 84 can be spherically concave, spherically convex, or flat, without depart from the scope of the invention.

Figure 21:
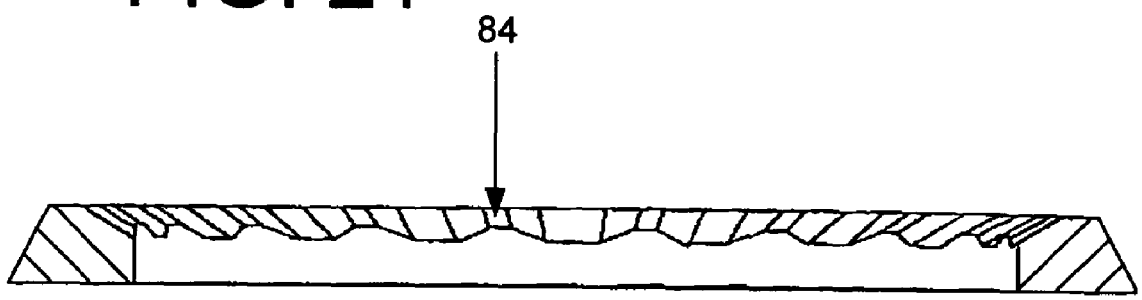
FIG. 21 is a close up side elevational view, partially in section, of a washer.

In an alternative embodiment the bearing surface 84 is undulating in shape. The bearing surface 84 of this embodiment is configured to cooperate with an annular surface 72. As depicted in FIG. 21, the bearing surface 84 is undulating in shape. The bearing surface 84 therein is provided with an annularly extending series of surfaces, which provide a uniform undulation around the entire bearing surface 84.

Figure 22:
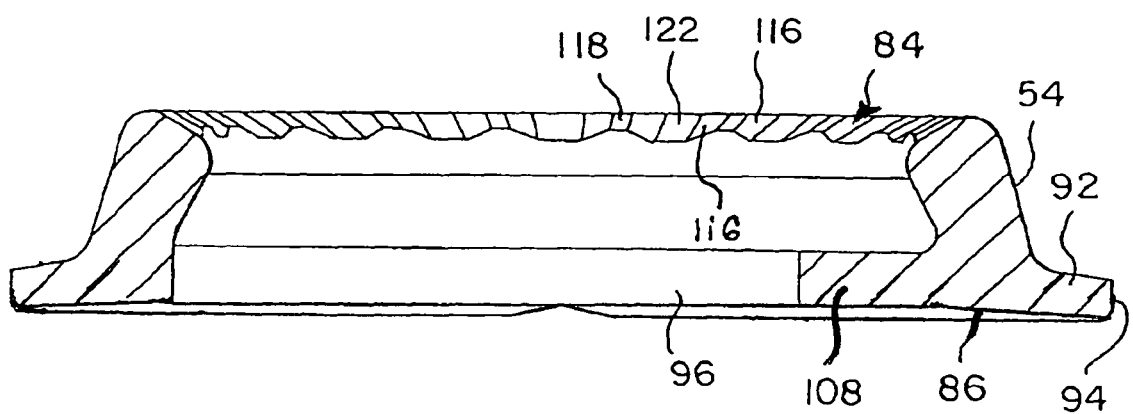
FIG. 22 is a side elevational view, partially in section, of a washer.
Figure 23:
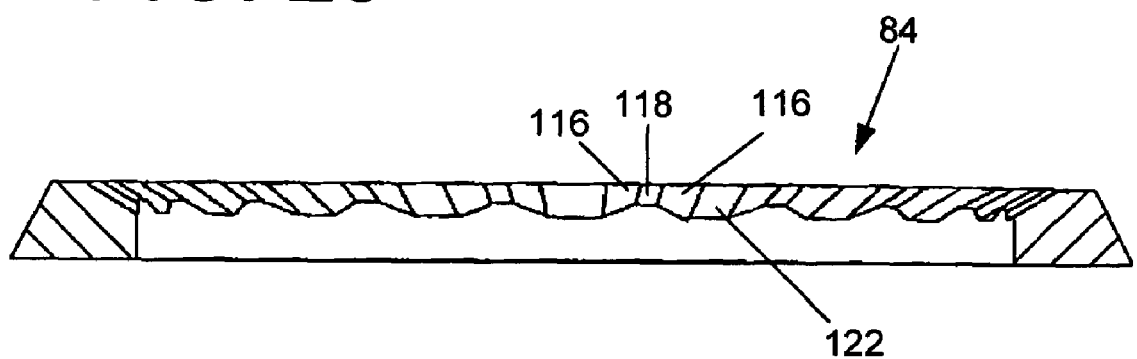
FIG. 23 is a close up side elevational view, partially in section, of a washer.

FIGS. 21 and 22 depict yet another alternative embodiment of the present invention. As depicted therein, the bearing surface 84 is provided with a plurality of upper peaks of an undulation. The upper peaks are provided as plateaus 118. The plateaus 118 are generally spherically concave The plateaus 118 are adjacent to a plurality of faces 116. Each plateau 74 is adjacent to a pair of faces 116. The bearing surface 84 of this alternative embodiment is provided with an annularly extending series of faces 116, which form a uniform undulation around the entire surface. The faces 116 are configured to correspond to faces 73 on the annular surface 72. As depicted in FIGS. 21 and 22, the faces 116 are generally spherically concave.

Each face 73 is adjacent to a valley 122. Each valley 122 is adjacent to a pair of faces 116. The valleys 122 are configured to be wider than valleys 75 on the annular surface 72.

As depicted in FIGS. 21 and 22, the valleys 122 are generally spherically concave and have a predetermined depth. In one embodiment, the depth is dimensioned according to the number of threads on the nut. The valleys 122 are formed in the forging process so that they are all concave and lie on the surface of an imaginary sphere whose center is on the axis of the washer body 82. The radius of that sphere ranges from 0.1 inches to 2.00 inches. As such, it will be seen that the plateaus 74 on the nut body 62 are perfectly complementary in shape to the valleys 122 on the washer body 82.

The valley 122 and adjacent faces 116 of the alternative embodiment provide an inverted Vee shape profile. The Vee shaped profile provides the plateaus 118 with a height. Advantageously, the height is dimensioned according to the distance between the plateau 74 and the valley 75. In the embodiment shown herein, the height equals the vertical distance between the plateau 118 and the valley 122. The height is preferably slightly greater than the clearance between the threads at 64 and those on a end, such as end 20 or 21, when the fastener assembly 50 is in place. In this alternative embodiment, the height ranges between 0 inches and 0.030 inches.

In an alternative embodiment, the height is dimensioned according to the number of threads, measured axially, per inch on the nut. Advantageously the height is related to the number of faces 73 or faces 116. By way of example and not limitation the height, in inches, is proportional to the number of threads per inch and the number of Vee-shaped undulations. In the preferred embodiment, depicted in FIGS. 21 and 22, the height is proportional to the product of the number of threads per inch and the number of Vee-shaped undulations. The height of this alternative embodiment ranges up to approximately 0.04167 of an inch.

In the preferred embodiment, washer body 82 is provided with a clamping surface 86. As depicted in FIG. 20, the clamping surface 86 is provided on the outer end 88 of the washer body 82. In the presently preferred embodiment, the clamping surface 86 is generally flat.

Figure 24:
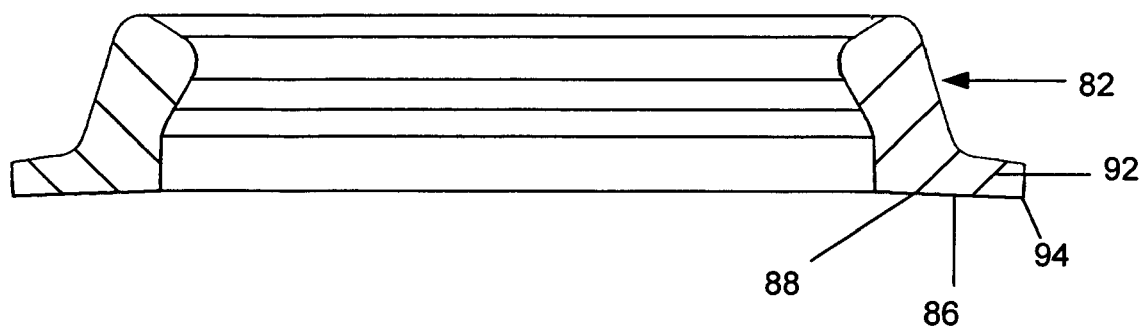
FIG. 24 is a side elevational view, partially in section, of a washer.

As depicted in FIGS. 21 and 24, in an alternative embodiment, the washer 54 is provided with an ear 108. The ear 108 is configured to cooperate with a u-bolt 5. The ear 108 cooperates with a slot 49 provided on at least a portion of the u-bolt 5. The ear 108 is of a size and shape suitable to slide loosely in an axially elongated slot 49 formed on one side of the threaded end section of a u-bolt 5. The ear 108 preferably cooperates with the slot 49 to prevent the washer 54 from rotating with respect to the u-bolt 5.

Figure 25:
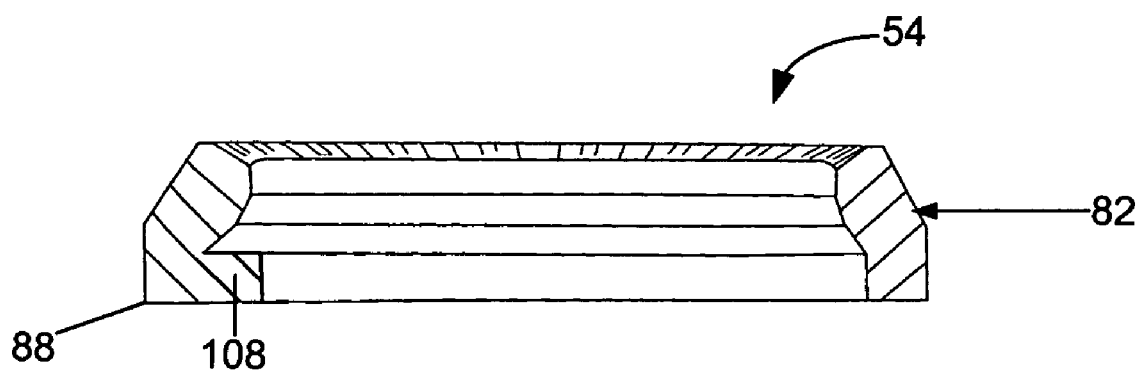
FIG. 25 is a side elevational view, partially in section, of a washer.
Figure 26:
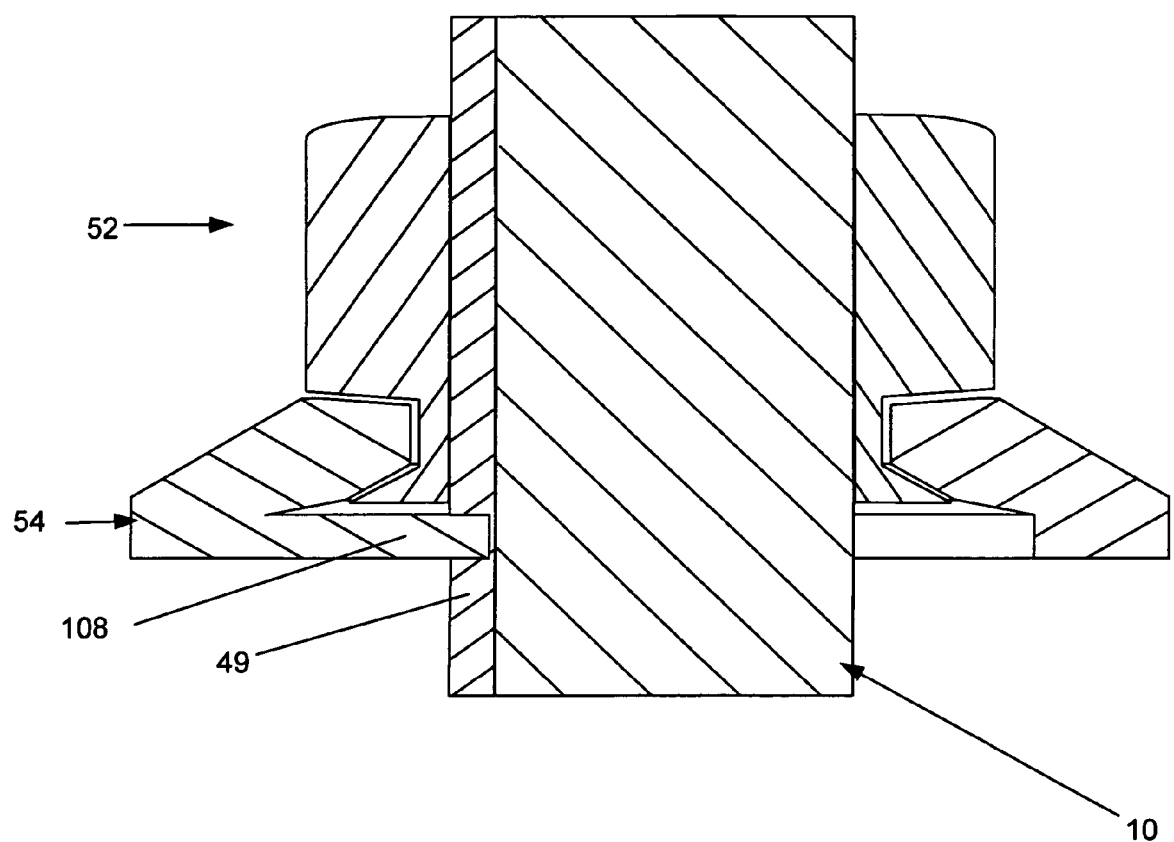
FIG. 26 is a side elevational view, partially in section, of a nut-washer assembly in cooperation with a end on a u-bolt.

FIG. 25 depicts an ear 108 extending inward from end face 88 washer body 82. FIG. 22 depicts the ear 108 extending inwardly of the base of the washer body 82, opposite a flange 92. Referring now to FIG. 26, the ear 108 is depicted cooperating with a slot 49 on a portion of a u-bolt 5.

Those skilled in the art will appreciate that the invention contemplates the use of other conventional means for preventing washer rotation. In the alternative, a flat may be formed on the u-bolt 5 and a corresponding flat formed inwardly of the washer body 82.

Figure 27:
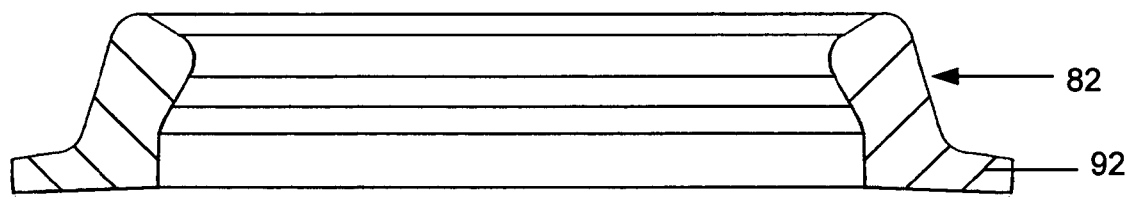
FIG. 27 is a side elevational view, partially in section, of a washer.

FIG. 27 depicts yet another alternative embodiment of the present invention. As shown therein, the washer 54 is provided with a flange 92. The flange 92 extends outward from the washer body 82. In this alternative embodiment, the flange 92 is between 0.05 inches and 0.12 inches thick.

In another alternative embodiment the flange 92 is provided with a plurality of slots formed inwardly from its outer edge, at regular intervals around the flange 92. The slots permit intervening flange sections 102 to resiliently flex, albeit only slightly, when the clamping surface 86 is forced against a surface and is under the desired load.

FIGS. 27 and 28 and depict the flange 92 provided with slots in the form of a plurality of cut-outs 98. The cut-outs 98 provide the flange 92 with a plurality of flange sections 102. Advantageously, the flange sections 102 are configured to flex axially. The flange sections 102 are configured to flex an axial distance which is slightly greater than the clearance between the threads on the u-bolt and the threads on the nut 52.

In the alternative embodiment depicted in FIGS. 27 and 28, the cut-outs 98 are generally U shaped. However those skilled in the art will appreciate that this invention contemplates utilizing cut-outs 98 with alternative shapes.

In the alternative embodiment depicted in FIGS. 27 and 28, the flange 92 is provided with six cut-outs 98 yielding six flange sections. However those skilled in the art will appreciate that any number of cut-outs 98 may be employed. In particular, those skilled in the art will appreciate that it is advantageous to utilize more or less than six cut-outs 98, depending on the size and thickness of the flange 92.

Figure 33:
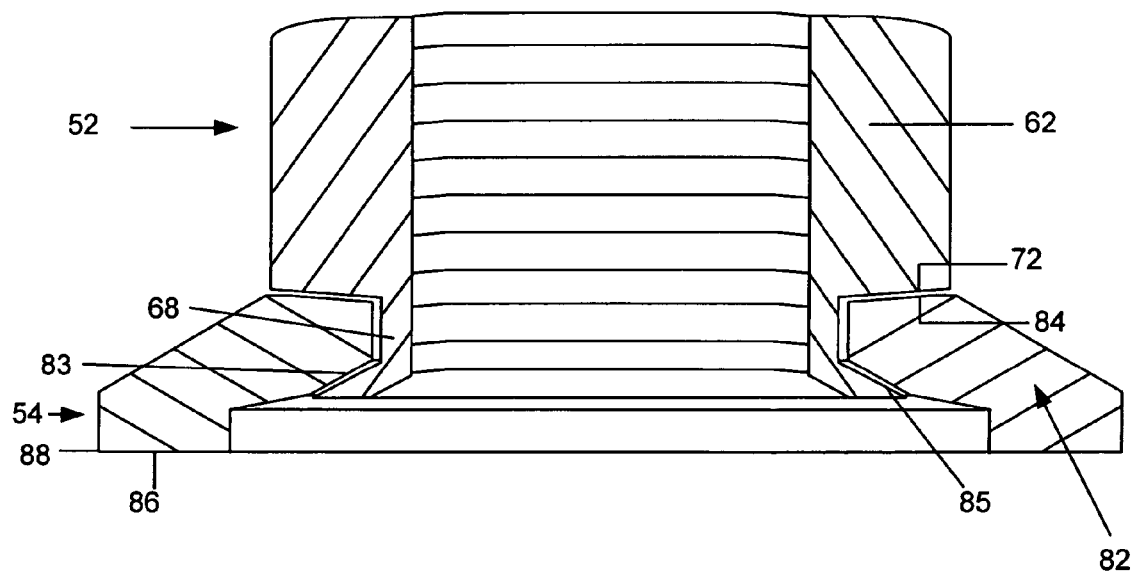
FIG. 33 is a side elevational view, partially in section, of a nut-washer assembly.

In yet another alternative embodiment of the present invention, the washer 54 is provided with a clamping surface 86. Referring to FIG. 33, at least a portion of the clamping surface 86 is located on the flange 92. As shown therein, the clamping surface 86 is located on the bottom of the flange 92 and the outer face 88 of the washer body 82.

Figure 34:
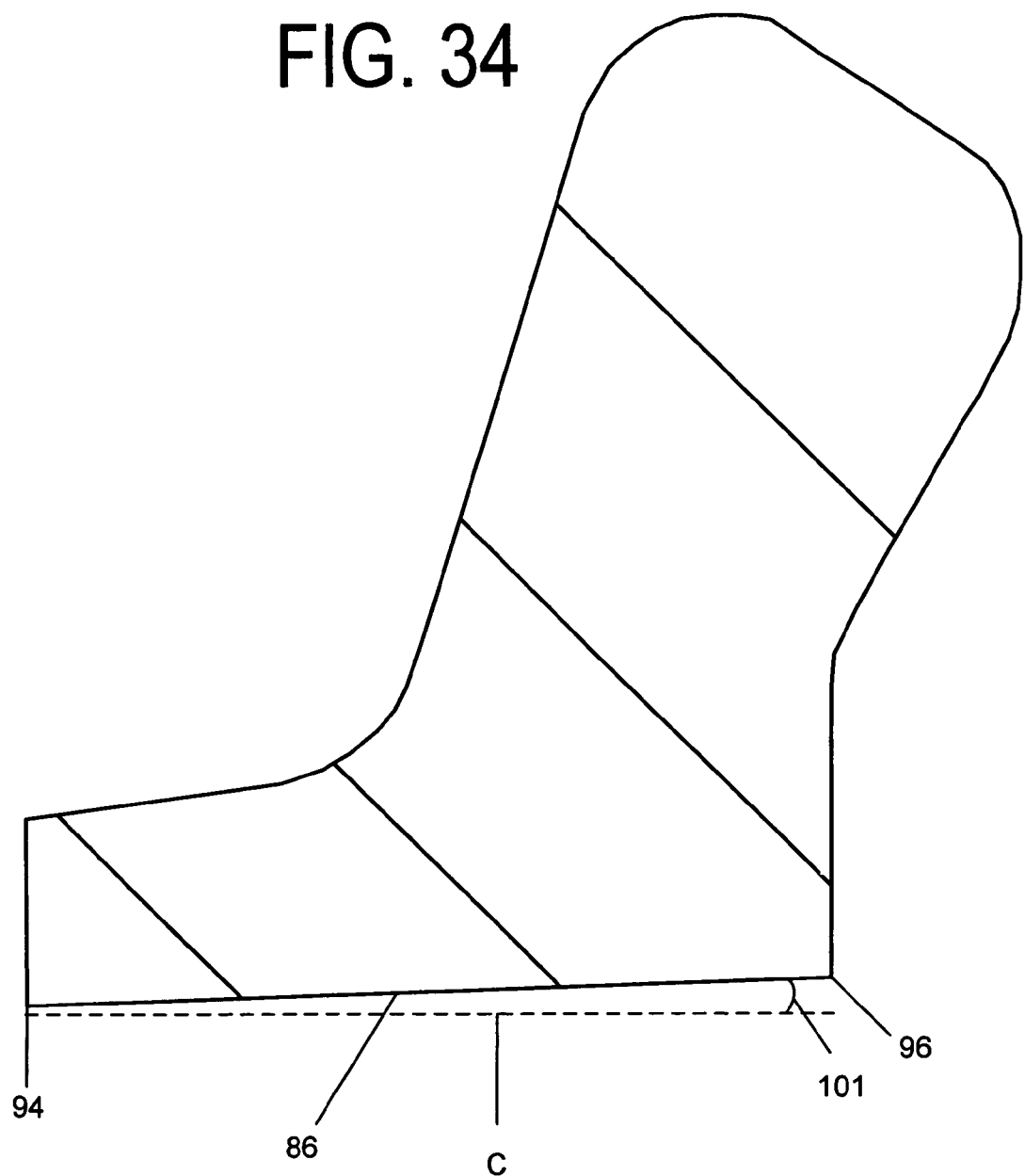
FIG. 34 is a close up side elevation view, partially in section, of a washer.

In this alternative embodiment, the slightly concave clamping surface 86 on the bottom of the washer 54 forms what approximates a shallow frustum of a cone. The clamping surface 86 is preferably inclined upwardly from the outer periphery 94 of the bottom of the washer flange 92 toward the inner periphery 96 of the body 82. As best depicted in FIG. 34, the clamping surface 86 is at an angle 101 with respect to imaginary line C, which runs perpendicular to the axis of the nut 52. Angle 101 ranges from 0° to 3°. In this alternative embodiment, the angle 101 is 2°.

In another alternative embodiment, the clamping surface 86 is provided with a plurality of depressions 104. Advantageously, the plurality of depressions 104 provide the clamping surface 86 with clamp segments 106. Advantageously, the clamp segments 106 are configured to flex axially.

Referring to FIG. 28, the depressions 104 are located on the bottom of the flange 92 and the outer face 88 of the washer body 82. In this alternative embodiment, the depressions 104 extend radially inward from corresponding cut-outs 98. As depicted in FIG. 28, the clamping surface 86 is provided with six depressions 104 that are generally Vee-shaped. However, those skilled in the art will appreciate that any number of depressions may be employed.

In the alternative embodiment depicted in FIG. 28, the depressions 104 effectively separate the annular clamp surface 86 into six clamp segments 106 that are provided with an arcuate shape. The arcuate outer extremities of the clamp segments 106 are located between the cut-outs 98 and are able to resiliently flex axially of the washer 54.

Figure 35:
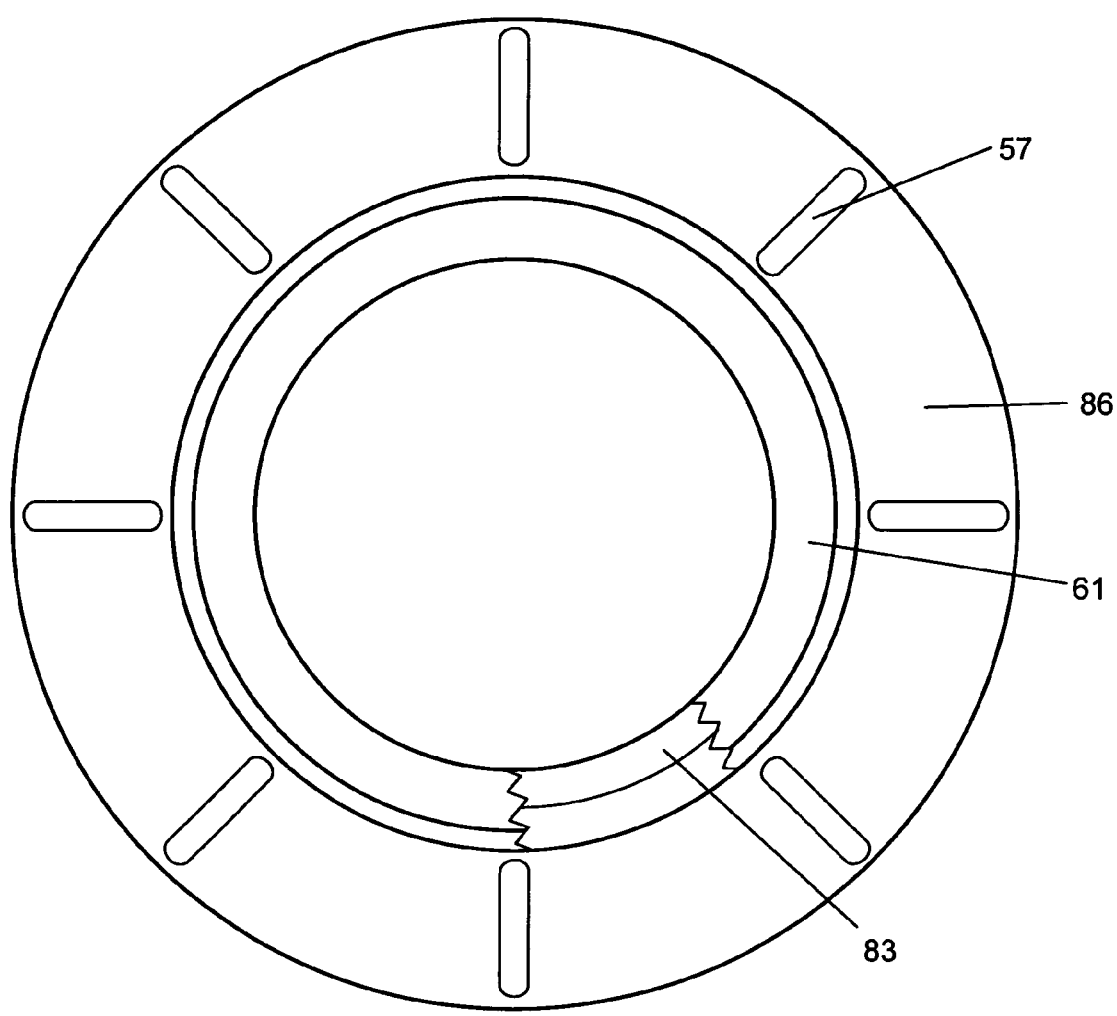
FIG. 35 is a bottom plain view, partially in section, of a nut-washer assembly.
Figure 36:
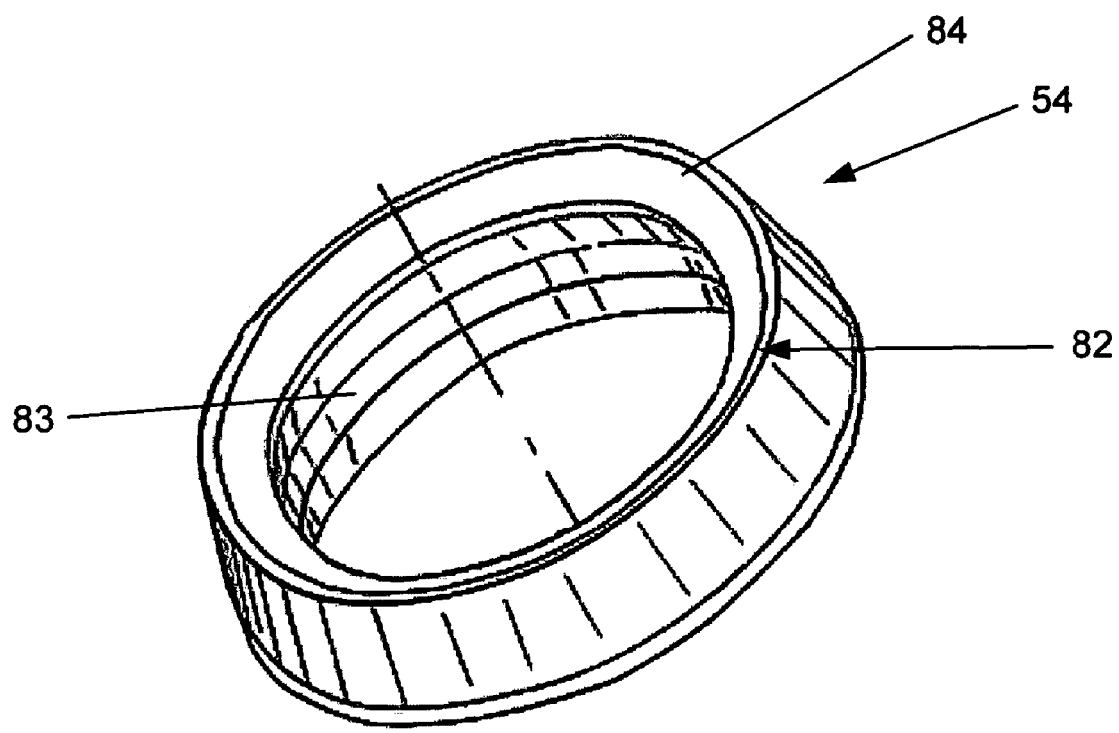
FIG. 36 is an exploded perspective view of a washer.
Figure 37:
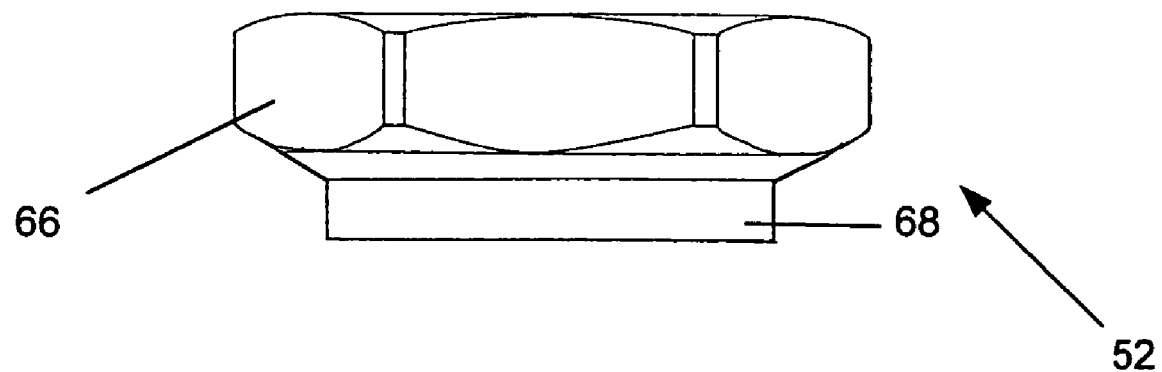
FIG. 37 is a side elevational view of a nut.
Figure 38:
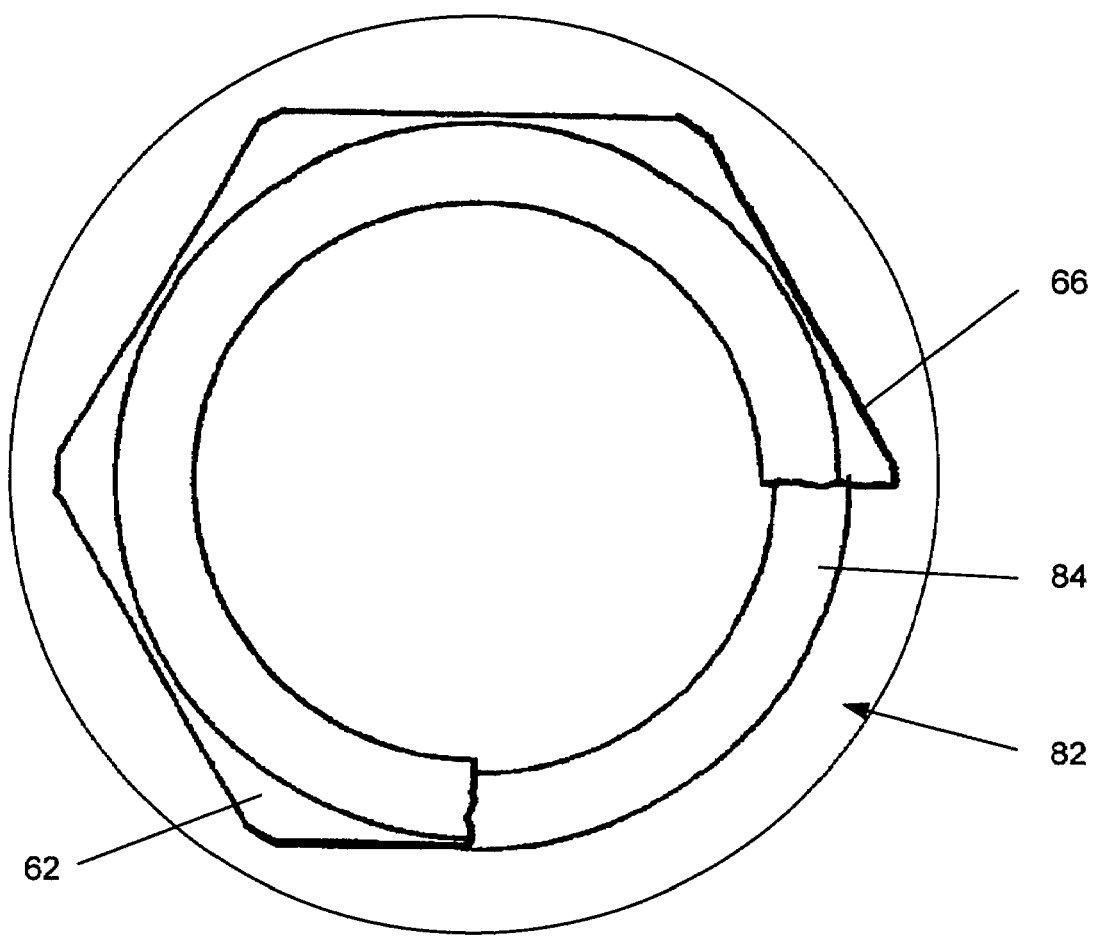
FIG. 38 is a top plain view, partially in section, of a nut-washer assembly.

FIG. 35 depicts the clamping surface 86 of an alternative embodiment. As shown therein the clamping surface 86 is provided with a plurality of protrusions 57. The protrusions 57 provide the clamping surface 86 with a higher frictional coefficient.

Figure 39:
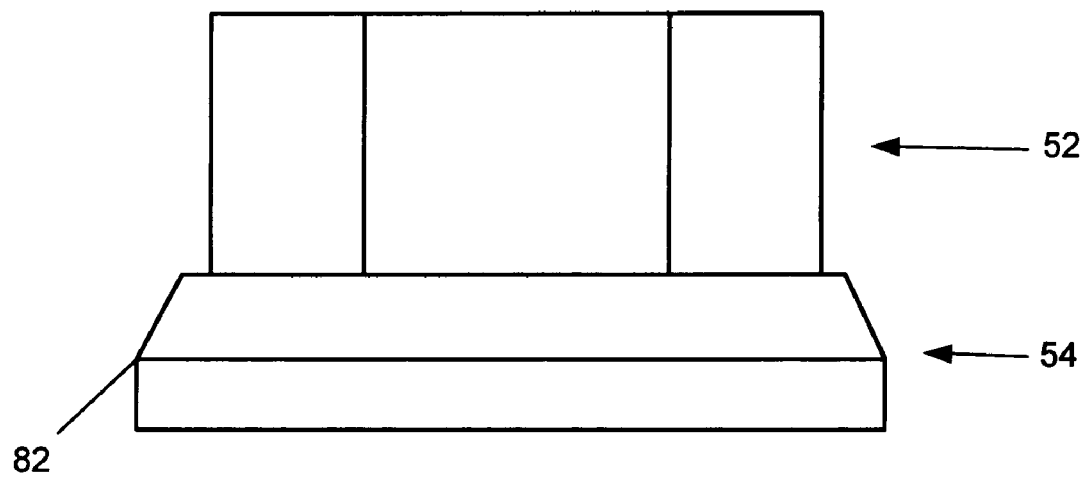
FIG. 39 is a side elevational view, of a nut-washer assembly.

The protrusions 57 are configured to cooperate with a surface on which the clamping surface 86 is fastened. Advantageously, the protrusions 57 cooperate with the surface to prevent the washer 54 from rotating with respect to the surface that is being fastened. FIG. 35 depicts a clamping surface 86 that is provided with eight (8) protrusions; however, a clamping surface 86 may be provided with more than eight (8) protrusions, such as twelve (12) protrusions. Alternatively, the nut body 62 may be provided with a clamping surface 86 having protrusions 57 rather than the washer 54 as depicted in FIG. 39.

FIG. 33 depicts the nut 52 and washer 54 assembled in the preferred embodiment. As depicted therein, the nut 52 and washer 54 are preferably assembled by inserting the skirt 68 into the washer 54, whereby the annular surface 72 is opposed to the bearing surface 84. Thereafter, at least a portion of the skirt 68 is forced outward to provide the collar 85. The collar 85 is configured to underlie a portion of the washer 54, whereby it loosely but securely connects the nut 52 and washer 54, while permitting the nut 52 to rotate freely relative to the washer 54.

FIG. 33 depicts the preferred embodiment, wherein the collar 85 underlies an annular inward projection 83 around its circumference. However, those skilled in the art will appreciate that the skirt 68 can be forced outward at spaced locations, which underlie a portion of the projection 83.

In one embodiment, when the nut-washer assembly 99 is rotated onto an end of the u-bolt 5, the internally threaded nut 52 engages threads on a end of the u-bolt, whereby the fastener assembly travels axially toward the curved portion 16 of the u-bolt. Upon further rotation, further axial travel of the nut-washer assembly 99 is resisted by the surface or surfaces that are being fastened, secured, or sealed. The resistance is at first relatively slight, however, upon further rotation the resistance increases until the nut 52 and washer 54 are seated against each other in nested relationship. In this nested relationship, each plateau 74 will seat uniformly on a corresponding valley 122 while opposed inclined faces 73 and 116 will be slightly separated. In this relationship, the peaks, provided as plateaus 74 and plateaus 118, on the annular surface 72 and bearing surface 84, respectively, ride over each other. As such, the annular surface 72 slips easily over the bearing surface 84 on the washer 54 as the nut 52 pushes the washer 54 before it.

Upon further rotation the resistance increases, the peaks ride over each other with greater and greater difficulty as the load increases. The resistance increases with greater and greater effect by the interlocking effect of the faces 73 on the nut 52 and the faces 116 on the washer 54. Eventually, they can slip past each other only when the flange sections 102 on the washer 54 begin to resiliently flex. As the nut turns, axial pressure builds, and as this pressure builds, the flange sections 102 begin to flex.

The flange sections 102 are designed to resiliently flex through an axial distance which is slightly greater than the clearance between the threads on u-bolt 5 and the threads on the nut 52. Because the flange sections 102 are able to flex slightly more than this clearance, the washer 54 can move axially under load to some degree without degradation of the lock between washer 54 and nut 52. At the same time, because the height of the plateau 118 above the valley 122 in the washer body 82 is slightly greater than the clearance also, once a locking relationship is established with the proper preload the nut 52 and washer 54 can move slightly relative to each other without loosening the nut-washer assembly 99.

The flexing of the flange sections 102 creates a resilient force tending to keep the faces 73 on the nut 52 and the faces 116 washer 54 in an interlocked relationship. In this locked relationship, a constant bearing load is resiliently maintained and the peaks of the nut 52 and washer 54 are seated generally flush against corresponding valleys 122 and valleys 75, respectively. Also, the faces 73 seat generally flush against the faces 116 and prevent the nut-washer assembly 99 from backing off. In particular, the leading faces 73 seat against trailing faces 116.

Moreover, because the faces 73 and faces 116 are preferably provided so as to be complementarily spherically convex and spherically concave, respectively, and all their radii of curvature axially of the nut-washer assembly 99 and from its axis equal those of the aforementioned valleys 122, locking surface contact is maintained between them even if the nut 52 and washer 54 are not precisely parallel to each other because the nut does not thread perfectly square onto a end of the u-bolt.

When a predetermined torque setting is reached in turning the nut 52 of the nut-washer assembly 99 onto a end of the u-bolt 5, the nut-washer assembly 99 can then be relied upon to resist all axial forces tending to cause the nut 52 to back off. Increased axial load merely causes the nut 52 and washer 54 to become more securely locked together. Only by applying loosening torque to the nut 52 again, as with a hex wrench, can the fastener assembly 150 be removed.

While this invention has been particularly shown and described with references to preferred embodiments thereof, it will be understood by those skilled in the art that various changes in form and details may be made therein without departing from the spirit and scope of the invention as defined by the appended claims.

Figure 40:
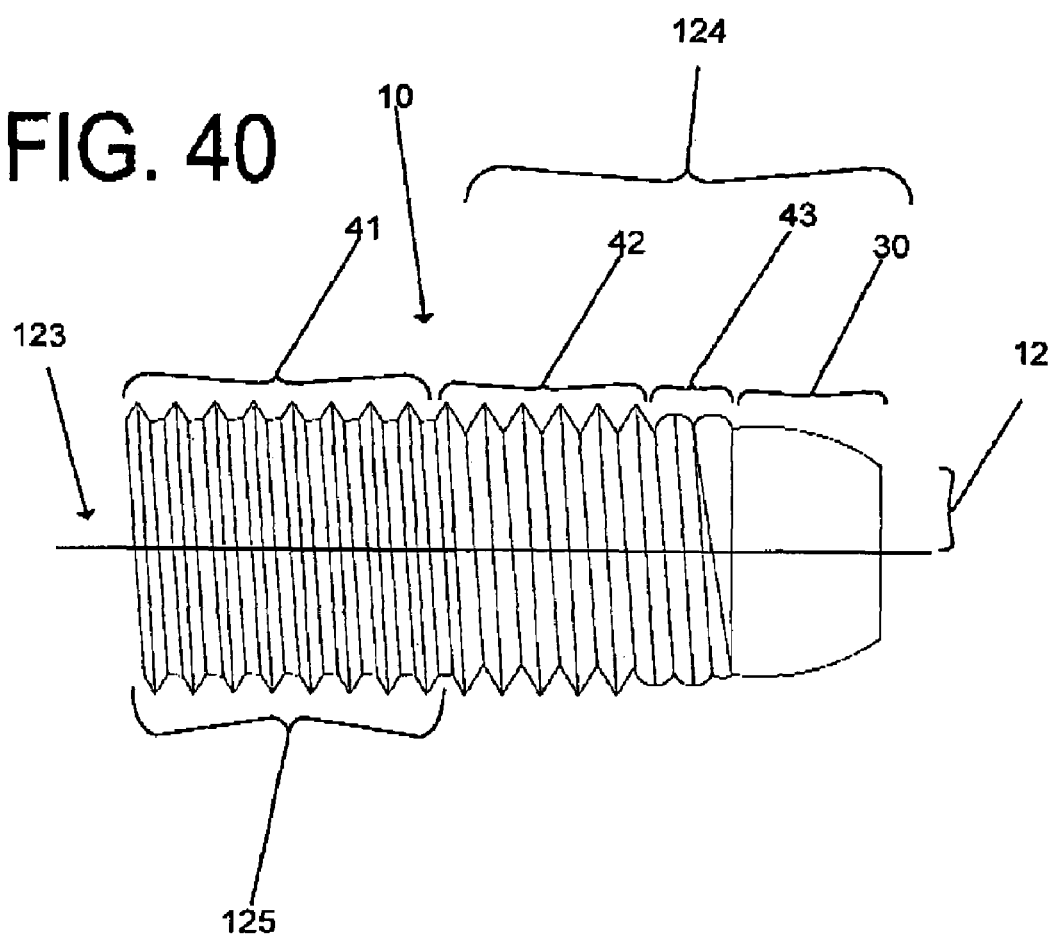
FIG. 40 depicts a close up view of one embodiment of a threaded surface on an end of the u-bolt.

Referring now to FIG. 40 the shaft 10 is provided with an axis 123, a first shaft element 124, and a second shaft element 125. The first shaft element 124 includes a first outer surface 126 and a radius 127. The radius 127 extends from the axis 123 of the shaft 10 to the first outer surface 126. The second shaft element 128 is provided with a locking thread 41 that includes a root surface 45. The distance between the axis 123 and the root surface 45 of the second shaft element 128 is greater than the radius 127 of the first shaft element 124.

What is claimed is:

1. A male fastener, comprising:
   a) a shaft that includes an axis, a first end, and a second end;
   b) the shaft is provided with a trilobular shape with a first threaded surface and a second threaded surface;
   c) the first threaded surface includes a first locking thread, a first guide thread, and a first conventional thread;
   d) the second threaded surface includes a second locking thread, a second guide thread, and a second conventional thread;
   e) the first guide thread includes a first guide means for guiding the threads on the shaft into mating alignment with a first female thread of a first female threaded member;
   f) the second guide thread includes a second guide means for guiding the threads on the shaft into mating alignment with a second female thread of a second female threaded member;
   g) the first guide thread is generally located at the first end of the shaft and leads directly into the first conventional thread, the second guide thread is generally located at the second end of the shaft and leads directly into the second conventional thread;
   h) the first conventional thread is provided with a first generally Vee-shaped root including a first root diameter configured to mate with the first female thread of the first female threaded member so as to be freely rotatable thereon;
   i) the second conventional thread is provided with a second generally Vee-shaped root including a second root diameter configured to mate with the second female thread of the second female threaded member so as to be freely rotatable thereon;
   j) the first conventional thread and the second conventional thread include a generally constant shape that extends for a plurality of turns, the first conventional thread leads directly into the first locking thread, the second conventional thread leads directly into the second locking thread; and
   k) the first locking thread includes a first root surface provided with a third root diameter that is greater than the first root diameter, the second locking thread includes a second root surface provided with a fourth root diameter that is greater than the second root diameter, wherein the first locking thread is configured to re-form the first female thread to resist relative rotation between the shaft and the first female threaded member, and the second locking thread is configured to re-form the second female thread to resist relative rotation between the shaft and the second female threaded member.

2. The male fastener according to claim 1, wherein at least one of the root surfaces is angled relative to the axis of the shaft.

3. The male fastener according to claim 1, wherein at least one of the root surfaces is at an angle between four and eight degrees relative to the axis of the shaft.

4. The male fastener according to claim 1, wherein at least one of the guide means includes a curved surface located between a first side and a second side.

5. The male fastener according to claim 1, wherein at least one of the guide means includes a curved surface located between a first side that is curved and a second side that is curved.

6. The male fastener according to claim 1, further comprising a conical surface that is provided on the male fastener.

7. The male fastener according to claim 1, further comprising a conical surface and a cylindrical surface that are provided on the male fastener.

8. The male fastener according to claim 1, further comprising:
   a) the female threaded members are rotatable about the axis of the shaft;
   b) the first female threaded member is provided with a first annular surface and the second female threaded member is provided with a second annular surface, wherein the annular surfaces on the female threaded members are provided with plurality of inclined faces oriented circumferentially forming portions of an undulating annular surface; and
   c) a first washer body rotatable relative to the first female threaded member and a second washer body rotatable relative to the second female threaded member, the washer bodies are provided with a bearing surface and a clamping surface, wherein the clamping surface includes a plurality of protrusions and the bearing surface is axially opposed to the annular surface on the female threaded members and provided with a plurality of inclined faces oriented circumferentially and forming portions of an undulating bearing surface.

9. A male fastener, comprising:
   a) a shaft that includes an axis, a first end, and a second end;
   b) the shaft is provided with a trilobular shape with a first threaded surface and a second threaded surface;
   c) the first threaded surface includes a first locking thread, a first guide thread, and a first conventional thread;
   d) the second threaded surface includes a second locking thread, a second guide thread, and a second conventional thread;
   e) the first guide thread includes a first guide means for guiding the threads on the shaft into mating alignment with a first female thread of a first female threaded member so that the first female threaded member can be torqued onto the first threaded surface of the shaft;
   f) the second guide thread includes a second guide means for guiding the threads on the shaft into mating alignment with a second female thread of a second female threaded member so that the second female threaded member can be torqued onto the second threaded surface of the shaft;
   g) the first guide thread is generally located at the first end of the shaft and leads directly into the first conventional thread, the second guide thread is generally located at the second end of the shaft and leads directly into the second conventional thread;

h) the first conventional thread is provided with a first generally Vee-shaped root including a first root diameter configured to mate with the first female thread of the first female threaded member so as to be freely rotatable thereon;

i) the second conventional thread is provided with a second generally Vee-shaped root including a second root diameter configured to mate with the second female thread of the second female threaded member so as to be freely rotatable thereon;

j) the first conventional thread and the second conventional thread include a generally constant shape that extends for a plurality of turns, the first conventional thread leads directly into the first locking thread, the second conventional thread leads directly into the second locking thread; and k) the first locking thread includes a first root surface provided with a third root diameter that is greater than the first root diameter the second locking thread includes a second root surface provided with a fourth root diameter that is greater than the second root diameter, wherein the first locking thread is configured to re-form the first female thread to resist relative rotation between the shaft and the first female threaded member, and the second locking thread is configured to re-form the second female thread to resist relative rotation between the shaft and the second female threaded member.

10. The male fastener according to claim 9, wherein at least one of the root surfaces is angled relative to the axis of the shaft.

11. The male fastener according to claim 9, wherein at least one of the root surfaces is at an angle between four and eight degrees relative to the axis of the shaft.

12. The male fastener according to claim 9, wherein at least one of the guide means includes a curved surface located between a first side and a second side.

13. The male fastener according to claim 9, wherein at least one of the guide means includes a curved surface located between a first side that is curved and a second side that is curved.

14. The male fastener according to claim 9, further comprising a conical surface that is provided on the male fastener.

15. The male fastener according to claim 9, further comprising a conical surface and a cylindrical surface that are provided on the male fastener.

16. The male fastener according to claim 9, further comprising:
a) the female threaded members are rotatable about the axis of the shaft;
b) the first female threaded member is provided with a first annular surface and the second female threaded member is provided with a second annular surface, wherein the annular surfaces on the female threaded members are provided with plurality of inclined faces oriented circumferentially forming portions of an undulating annular surface; and
c) a first washer body rotatable relative to the first female threaded member and a second washer body rotatable relative to the second female threaded member, the washer bodies are provided with a bearing surface and a clamping surface, wherein the clamping surface includes a plurality of protrusions and the bearing surface is axially opposed to the annular surface on the female threaded members and provided with a plurality of inclined faces oriented circumferentially and forming portions of an undulating bearing surface.

17. A male fastener, comprising:
a) a shaft that is provided with a trilobular shape with a first threaded surface and and second threaded surface, and that further includes a first guide thread, a first conventional thread, a first locking thread, a second guide thread, a second conventional thread, and a second locking thread;
b) the first guide thread includes a first guide means for guiding the threads on the shaft into mating alignment with a first female thread of a first female threaded member;
c) the second guide thread includes a second guide means for guiding the threads on the shaft into mating alignment with a second female thread of a second female threaded member;
d) the fast guide thread is generally located at a first end of the shaft and leads directly into the first conventional thread, the second guide thread is generally located at a second end of the shaft and leads directly into the second conventional thread;
e) the first conventional thread is provided with a first generally Vee-shaped root including a first root diameter configured to mate with the first female thread of the first female threaded member so as to be freely rotatable thereon;
f) the second conventional thread is provided with a second generally Vee-shaped root including a second root diameter configured to mare with the second female thread of the second female threaded member so as to be freely rotatable thereon;
g) the first conventional thread and the second conventional thread include a generally constant shape that extends for a plurality of turns, the first conventional thread leads directly into the first locking thread, the second conventional thread leads directly into the second locking thread; and
h) the first locking thread includes a first root surface provided with a third root diameter that is greater than the first root diameter, the second locking thread includes a second root surface provided with a fourth root diameter that is greater than the second root diameter, wherein the first locking thread is configured to re-form the first female thread to resist relative rotation between the shaft and the first female threaded member, and the second locking thread is configured to re-form the second female thread to resist relative rotation between the shaft and the second female threaded member.

18. The male fastener according to claim 17, wherein at least one of the root surfaces is angled relative to an axis of the shaft.

19. The male fastener according to claim 17, wherein at least one of the root surfaces is at an angle between four and eight degrees relative to an axis of the shaft.

20. The male fastener according to claim 17, wherein at least one of the guide means includes a curved surface located between a first side and a second side.

21. The male fastener according to claim 17, wherein at least one of the guide means includes a curved surface located between a first side that is curved and a second side that is curved.

22. The male fastener according to claim 17, further comprising a conical surface that is provided on the male fastener.

23. The male fastener according to claim 17, further comprising a conical surface and a cylindrical surface that are provided on the male fastener.

24. The male fastener according to claim 17, further comprising:

a) the female threaded members are rotatable about the axis of the shaft;
b) the first female threaded member is provided with a first annular surface and the second female threaded member is provided with a second annular surface, wherein the annular surfaces on the female threaded members are provided with a plurality of inclined faces oriented circumferentially forming portions of an undulating annular surface; and
c) a fast washer body rotatable relative to the first female threaded member and a second washer body rotatable relative to the second female threaded member, the washer bodies are provided with a hearing surface and a clamping surface, wherein the clamping surface includes a plurality of protrusions and the bearing surface is axially opposed to the annular surface on the female threaded members and provided with a plurality of inclined faces oriented circumferentially and forming portions of an undulating bearing surface.

* * * * *